US011046056B2

(12) United States Patent
Schibull et al.

(10) Patent No.: US 11,046,056 B2
(45) Date of Patent: Jun. 29, 2021

(54) SHEETLIKE COMPOSITE, ESPECIALLY FOR DIMENSIONALLY STABLE CONTAINERS, WITH AN OUTER THERMOPLASTIC SEALING LAYER APPLIED OVER PART OF THE SURFACE, ESPECIALLY FOR SEALING A LONGITUDINAL SEAM

(71) Applicant: SIG TECHNOLOGY AG, Neuhausen (CH)

(72) Inventors: Dirk Schibull, Baal (DE); Michael Wolters, Heinsberg (DE)

(73) Assignee: SIG TECHNOLOGY AG, Neuhausen (CH)

( * ) Notice: Subject to any disclaimer, the term of this patent is extended or adjusted under 35 U.S.C. 154(b) by 535 days.

(21) Appl. No.: 15/752,800

(22) PCT Filed: Aug. 12, 2016

(86) PCT No.: PCT/EP2016/069245
§ 371 (c)(1),
(2) Date: Feb. 14, 2018

(87) PCT Pub. No.: WO2017/029218
PCT Pub. Date: Feb. 23, 2017

(65) Prior Publication Data
US 2019/0001624 A1   Jan. 3, 2019

(30) Foreign Application Priority Data
Aug. 14, 2015  (DE) .................. 10 2015 010 404

(51) Int. Cl.
*B32B 15/085*    (2006.01)
*B41M 1/10*      (2006.01)
(Continued)

(52) U.S. Cl.
CPC .............. *B32B 15/085* (2013.01); *B32B 1/02* (2013.01); *B32B 3/14* (2013.01); *B32B 5/142* (2013.01);
(Continued)

(58) Field of Classification Search
CPC ......... B41M 5/502; B41M 1/04; B54D 75/26; B54D 1/00; B32B 15/20; B32B 15/085;
(Continued)

(56) References Cited

U.S. PATENT DOCUMENTS

| 5,385,527 A | 1/1995 | Fukada et al. |
| 5,824,448 A | 10/1998 | Liu et al. |

(Continued)

FOREIGN PATENT DOCUMENTS

| CN | 1548302 A | 11/2004 |
| DE | 10311125 A1 | 11/2003 |

(Continued)

OTHER PUBLICATIONS

Office Action relating to Chinese Application No. 201680045177.0, dated Mar. 11, 2020.
(Continued)

*Primary Examiner* — Ruiyun Zhang
(74) *Attorney, Agent, or Firm* — Meunier Carlin & Curfman LLC

(57) ABSTRACT

The invention relates to a sheetlike composite (100) comprising a first composite region (101) and a second composite region (102); wherein the first composite region (101) comprises, as mutually superposed layers from an outer surface (104) of the first composite region (101) to an inner surface (103) of the first composite region (101): a) a thermoplastic layer A (110), b) a carrier layer (108), c) a barrier layer (106), and d) an inner polymer layer (105); wherein the outer surface (104) of the first composite region
(Continued)

Figure 1:
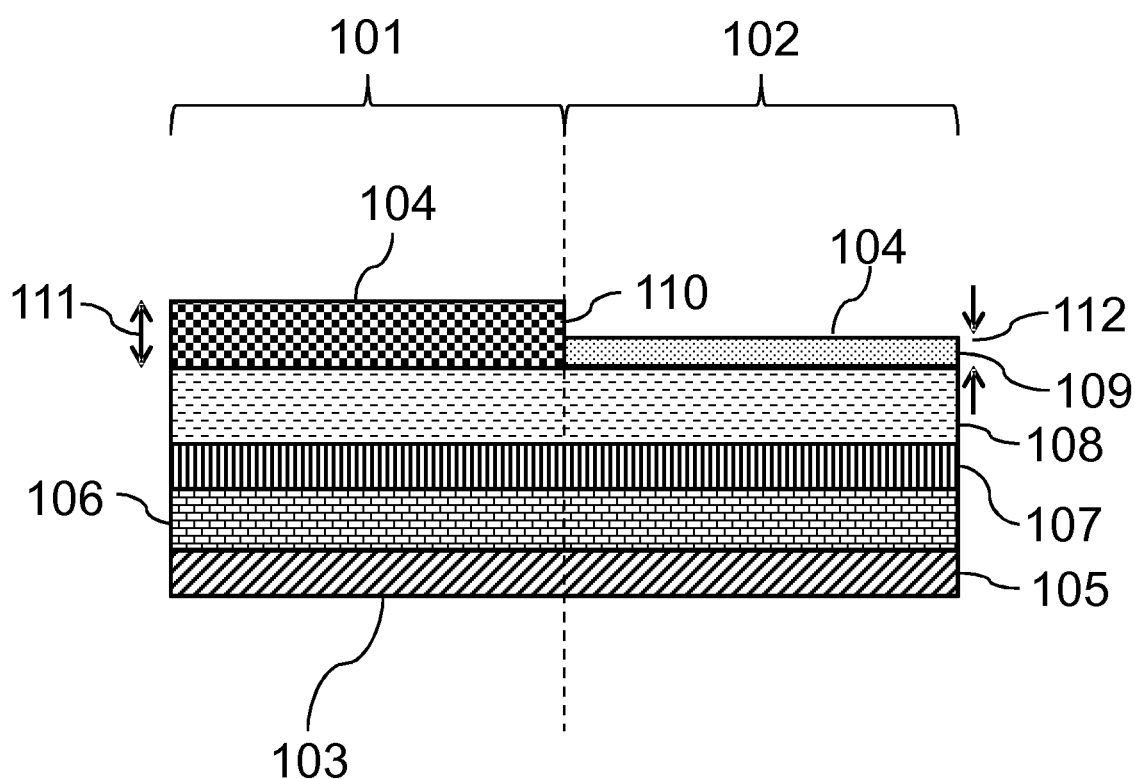

(101) is a surface of the thermoplastic layer A (110); wherein the second composite region (102) comprises, as mutually superposed layers from an outer surface (104) of the second composite region (102) to an inner surface (103) of the second composite region (102): A) a first thermoplastic layer B (109), B) the carrier layer (108); C) the barrier layer (106); and D) the inner polymer layer (105); wherein the outer surface (104) of the second composite region (102) is a surface of the first thermoplastic layer B (109); wherein the second composite region (102) does not comprise any part of the thermoplastic layer A (110); wherein a layer thickness (111) of the thermoplastic layer A (110) in the first composite region (101) is more than a layer thickness (112) of the first thermoplastic layer B (109) in the second composite region (102). The invention further relates to a process of printing a sheetlike composite; to a container precursor; to closed containers; to a device for printing; and to use of a polyvinyl acetal.

8 Claims, 11 Drawing Sheets

(51) Int. Cl.
    B32B 27/30      (2006.01)
    B32B 27/32      (2006.01)
    B32B 1/02       (2006.01)
    B32B 27/08      (2006.01)
    B32B 27/10      (2006.01)
    B32B 5/14       (2006.01)
    B32B 29/00      (2006.01)
    B32B 7/12       (2006.01)
    B32B 3/14       (2006.01)
    B32B 15/20      (2006.01)
    B32B 27/20      (2006.01)
    B41M 5/50       (2006.01)
    B65D 75/26      (2006.01)
    B41M 1/04       (2006.01)
(52) U.S. Cl.
    CPC .............. *B32B 7/12* (2013.01); *B32B 15/20* (2013.01); *B32B 27/08* (2013.01); *B32B 27/10* (2013.01); *B32B 27/20* (2013.01); *B32B 27/306* (2013.01); *B32B 27/32* (2013.01); *B32B 29/002* (2013.01); *B41M 1/10* (2013.01); *B41M 5/502* (2013.01); *B65D 75/26* (2013.01); *B32B 2250/44* (2013.01); *B32B 2255/10* (2013.01); *B32B 2255/20* (2013.01); *B32B 2270/00* (2013.01); *B32B 2307/31* (2013.01); *B32B 2307/4023* (2013.01); *B32B 2307/514* (2013.01); *B32B 2307/718* (2013.01); *B32B 2307/7244* (2013.01); *B32B 2307/732* (2013.01); *B32B 2307/736* (2013.01); *B32B 2307/75* (2013.01); *B32B 2439/62* (2013.01); *B32B 2439/70* (2013.01); *B41M 1/04* (2013.01)
(58) Field of Classification Search
    CPC ........... B32B 27/20; B32B 27/32; B32B 3/10; B32B 3/14; B32B 2439/40; B32B 2255/00; B32B 2307/75; B32B 2307/732; B32B 2307/4023; B32B 2250/44
    USPC ........ 428/35.7, 34.1, 34.2, 36.91, 35.9, 34.3
    See application file for complete search history.

(56) References Cited

U.S. PATENT DOCUMENTS

| 2006/0260481 | A1  | 11/2006 | Becker et al. |
| 2012/0258228 | A1  | 11/2012 | Wolters et al. |
| 2014/0248500 | A1* | 9/2014  | Yoshida ................ C08J 7/06 428/448 |

FOREIGN PATENT DOCUMENTS

| DE | 10252553 A1  | 6/2004  |
| EP | 0684184 B1   | 5/1995  |
| EP | 1164085 A1   | 12/2001 |
| EP | 1475207 A2   | 11/2004 |
| GB | 2055743 B    | 7/1983  |
| WO | 90/09926 A2  | 9/1990  |
| WO | 0039200 A1   | 7/2000  |
| WO | 2010041289 A1| 4/2010  |
| WO | 2013013801 A1| 1/2013  |

OTHER PUBLICATIONS

"Polyvinyl butyral", Wikipedia, Oct. 20, 2019.
Notice of Allowance, in connection to U.S. Appl. No. 15/752,767, dated Jul. 16, 2020.
International Search Report and Written Opinion issued for International Application No. PCT/EP2016/069245, dated Feb. 12, 2016.
P. H. Farmer, B. A. Jemmott; "Polyvinyl Acetal Adhesives", "Section B" In: "Handbook of Adhesives", 1990, Springer US, New York, XP002764045, ISBN: 978-1-4612-8019-4 p. 423, DOI:10. 1007/978-1-4613-0671-9_24, p. 423.
Non-Final Office Action, in connection with U.S. Appl. No. 15/752,767, dated Aug. 9, 2019.
Final Office Action, relating to U.S. Appl. No. 15/752,767, dated Dec. 2, 2019.
Advisory Action, relating to U.S. Appl. No. 15/752,767, dated Feb. 10, 2020.
International Search Report and Written Opinion issued for International Application PCT/EP2016/069248, dated Feb. 12, 2016.
Notice of Allowance issued for U.S. Appl. No. 15/752,767, dated May 1, 2020.
Office Action relating to Chinese Application No. 201680045177.0, dated Sep. 27, 2019. (English translation).

* cited by examiner

100

100

100

100

700

800

1000

1100

1100

SHEETLIKE COMPOSITE, ESPECIALLY FOR DIMENSIONALLY STABLE CONTAINERS, WITH AN OUTER THERMOPLASTIC SEALING LAYER APPLIED OVER PART OF THE SURFACE, ESPECIALLY FOR SEALING A LONGITUDINAL SEAM

The present invention relates to a rigid sheetlike composite for food or drink product containers, wherein the sheetlike composite comprises a first composite region and a second composite region; wherein the first composite region comprises, as mutually superposed layers from an outer surface of the first composite region to an inner surface of the first composite region:
 a) a thermoplastic layer A,
 b) a carrier layer,
 c) a barrier layer, and
 d) an inner polymer layer;
wherein the outer surface of the first composite region is a surface of the thermoplastic layer A; wherein the second composite region as mutually superposed layers from an outer surface of the second composite region to an inner surface of the second composite region comprises:
 A) a first thermoplastic layer B,
 B) the carrier layer;
 C) the barrier layer; and
 D) the inner polymer layer;
wherein the outer surface of the second composite region is a surface of the first thermoplastic layer B; wherein the second composite region does not comprise any part of the thermoplastic layer A; wherein a layer thickness of the thermoplastic layer A in the first composite region is more than a layer thickness of the first thermoplastic layer B in the second composite region. The invention further relates to a process of printing a rigid sheetlike composite; to a container precursor; to a closed container, especially for foodstuff; to a device for printing a rigid sheetlike composite; and to use of a polyvinyl acetal for joining a fold-over excess to a body of a closed container.

For some time, foodstuffs have been preserved, whether they be food and drink products for human consumption or else animal feed products, by storing them either in a can or in a jar closed by a lid. In this case, shelf life can be increased firstly by separately and very substantially sterilizing the foodstuff and the container in each case, here the jar or can, and then introducing the food or drink product into the container and closing the container. However, these measures of increasing the shelf life of foodstuff, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. Moreover, production of glass, tinplate or aluminium, even when the raw materials used for the purpose are recycled, necessitates quite a high expenditure of energy. In the case of jars, an aggravating factor is elevated expenditure on transport. The jars are usually prefabricated in a glass factory and then have to be transported to the facility where the foodstuff is dispensed with utilization of considerable transport volumes. Furthermore, jars and cans can be opened only with considerable expenditure of force or with the aid of tools and hence in a rather laborious manner. In the case of cans, there is a high risk of injury emanating from sharp edges that arise on opening. In the case of jars, it is a repeated occurrence that broken glass gets into the food or drink product in the course of filling or opening of the filled jars, which can lead in the worst case to internal injuries on consumption of the foodstuff. In addition, both cans and jars have to be labelled for identification and promotion of the foodstuff contents. The jars and cans cannot be printed directly with information and promotional messages. In addition to the actual printing, a substrate is thus needed for the purpose, a paper or suitable film, as is a securing means, an adhesive or sealant.

Other packaging systems are known from the prior art, in order to store foodstuffs over a long period with minimum impairment. These are containers produced from sheetlike composites—frequently also referred to as laminates. Sheetlike composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2.

These laminate containers already have many advantages over the conventional jars and cans. Nevertheless, there are improvement opportunities even in the case of these packaging systems. For instance, to create decoration, a printing ink is applied to the outer thermoplastic plastic layer. In this case, this outer plastic layer has to be prepared for application of long-lived and stable printed decoration in a complex manner. It is also only possible to print on polymer surfaces with a limited number of printing ink systems. A further disadvantage is the use of material over a large area in the outer polymer surface. Moreover, the laminate container, by virtue of the outer polymer surface, is difficult for the consumer to grip under some circumstances, for example in the case of condensation of moisture on the surface, without the container slipping out of the consumer's hand. It is likewise a disadvantage that a high energy input for melting of the polymer layer used for sealing has to be introduced in the sealing operation. In this case, there can additionally be deposits on the sealing tools, which then in turn cause long shutdown and cleaning times for the dispensing machine.

In general terms, it is an object of the present invention to at least partly overcome one disadvantage which arises from the prior art. It is a further object of the invention to provide a laminate container having an improved printed surface. It is a further object of the invention to provide a laminate container which can be printed without complex preparation of the outer surface. It is a further object of the invention to provide a laminate container which is easy to grip by the consumer even in the case of condensed moisture on the outer surface. In addition, it is an object of the invention to be able to utilize a multitude of printing systems for application of decoration to a laminate container or a laminate for a laminate container. Moreover, it is an object of the invention to provide a laminate container which is environmentally friendly in terms of its composition or production process or both. It is a further object of the invention to provide a laminate container wherein the sealed regions, for example a longitudinal seam, have a high seal strength. It is also an object of the invention to provide a laminate container having robust printed decoration.

A contribution to at least partial achievement of at least one of the above objects is made by the independent claims. The dependent claims provide preferred embodiments which contribute to at least partial achievement of at least one of the objects.

A contribution to the achievement of at least one of the objects of the invention is made by an embodiment 1 of a sheetlike composite 1, comprising a first composite region and a second composite region; wherein the first composite region comprises, as mutually superposed layers from an outer surface of the first composite region to an inner surface of the first composite region:
- a) a thermoplastic layer A,
- b) a carrier layer,
- c) a barrier layer, and
- d) an inner polymer layer;

wherein the outer surface of the first composite region is a surface of the thermoplastic layer A; wherein the second composite region comprises, as mutually superposed layers from an outer surface of the second composite region to an inner surface of the second composite region:
- A) a first thermoplastic layer B,
- B) the carrier layer;
- C) the barrier layer; and
- D) the inner polymer layer;

wherein the outer surface of the second composite region is a surface of the first thermoplastic layer B; wherein the second composite region does not comprise any part of the thermoplastic layer A; wherein a layer thickness of the thermoplastic layer A in the first composite region is more than a layer thickness of the first thermoplastic layer B in the second composite region. In a further preferred configuration, the first thermoplastic layer B in the second composite region directly adjoins the carrier layer. Preferably, the layer thickness of the thermoplastic layer A in the first composite region is 4 µm, more preferably 8 µm, most preferably 12 µm, more than the layer thickness of the first thermoplastic layer B in the second composite region.

In one embodiment 2 according to the invention, the sheetlike composite 1 is configured according to embodiment 1, wherein the sheetlike composite in the second composite region between the first thermoplastic layer B and the carrier layer comprises at least one further thermoplastic layer B, preferably at least 2 further thermoplastic layers B, more preferably at least 3 further thermoplastic layers B, most preferably at least 4 further thermoplastic layers B, wherein the layer thickness of the thermoplastic layer A in the first composite region is more than a total layer thickness of the first thermoplastic layer B and the further thermoplastic layer B, preferably the further thermoplastic layers B, in the second composite region. Preferably, the first thermoplastic layer B and the further thermoplastic layer B, preferably the further thermoplastic layers B, cover one another directly, i.e. without interlayers. Preferably, the layer thickness of the thermoplastic layer A in the first composite region is 4 µm, more preferably 8 µm, most preferably 12 µm, more than a total layer thickness of the first thermoplastic layer B and the further thermoplastic layer B, preferably the further thermoplastic layers B, in the second composite region.

In one embodiment 3 according to the invention, the sheetlike composite 1 is configured according to embodiment 1 or 2, wherein the thermoplastic layer A is characterized by a proportion by weight of colourants which is preferably 50% by weight, more preferably 75% by weight, most preferably 100% by weight, lower than the first thermoplastic layer B or each further thermoplastic layer B or both, where the figures in % by weight are correspondingly based on the first thermoplastic layer B or each further thermoplastic layer B or both. A preferred thermoplastic layer A does not comprise any colourant or any pigment or both.

In one embodiment 4 according to the invention, the sheetlike composite 1 is configured according to embodiment 1 or 2, wherein the thermoplastic layer A is characterized by a proportion by weight of pigments which is preferably 50% by weight, more preferably 75% by weight, most preferably 100% by weight, lower than the first thermoplastic layer B or each further thermoplastic layer B or both, where the figures in % by weight are correspondingly based on the first thermoplastic layer B or each further thermoplastic layer B or both. A preferred thermoplastic layer A does not comprise any colourant or any pigment or both.

In one embodiment 5 according to the invention, the sheetlike composite 1 is configured according to any of the preceding embodiments, wherein the sheetlike composite in the first composite region is characterized by a total thickness of all layers of the sheetlike composite which are on a side of the carrier layer remote from the barrier layer in a range from 0.5 to 15 µm, preferably from 1 to 12 µm, more preferably from 3 to 9 µm. The layers which are on the side of the carrier layer remote from the barrier layer include at least the thermoplastic layer A. In addition, the first thermoplastic layer B, and more preferably the further thermoplastic layers B as well, may also be among the layers that are on the side of the carrier layer remote from the barrier layer in the first composite region.

In one embodiment 6 according to the invention, the sheetlike composite 1 is configured according to any of the preceding embodiments, wherein the sheetlike composite in the second composite region is characterized by a total thickness of all layers of the sheetlike composite which are on a side of the carrier layer remote from the barrier layer in a range from 0.5 to 5 µm, preferably from 1 to 4 µm, more preferably from 1.5 to 3 µm. The layers which are on the side of the carrier layer remote from the barrier layer include at least the first thermoplastic layer B, and more preferably the further thermoplastic layers B as well. The thermoplastic layer A cannot be among the layers that are on the side of the carrier layer remote from the barrier layer in the second composite region.

In one embodiment 7 according to the invention, the sheetlike composite 1 is configured according to any of the preceding embodiments, wherein the thermoplastic layer A comprises not more than 40% by weight, preferably not more than 35% by weight, more preferably not more than 30% by weight, more preferably not more than 25% by weight, more preferably not more than 20% by weight, more preferably not more than 15% by weight, more preferably not more than 10% by weight, most preferably not more than 5% by weight, based in each case on the weight of the thermoplastic layer A, of a polyolefin, preferably polyethylene.

In one embodiment 8 according to the invention, the sheetlike composite 1 is configured according to any of the preceding embodiments, wherein the thermoplastic layer A comprises a polyvinyl acetal in a proportion of at least 40% by weight, preferably at least 45% by weight, more preferably at least 50% by weight, more preferably at least 55% by weight, most preferably at least 60% by weight, based in each case on the weight of the thermoplastic layer A.

In one embodiment 9 according to the invention, the sheetlike composite 1 is configured according to any of the preceding embodiments, wherein the first thermoplastic layer B or each further thermoplastic layer B or both comprise(s) one or more colourants in a total proportion of 1% to 30% by weight, preferably 3% to 27% by weight in total, more preferably of 5% to 24% by weight in total, most preferably of 10% to 20% by weight in total, based in each case on the weight of the respective thermoplastic layer B.

In one embodiment 10 according to the invention, the sheetlike composite 1 is configured according to any of the preceding embodiments, wherein the outer surface of the first composite region is 3% to 30%, preferably 5% to 17%, more preferably 9% to 12%, of a total outer surface area of the sheetlike composite.

In one embodiment 11 according to the invention, the sheetlike composite 1 is configured according to any of the preceding embodiments, wherein the first composite region adjoins the second composite region.

In one embodiment 12 according to the invention, the sheetlike composite 1 is configured according to any of the preceding embodiments, wherein the sheetlike composite in the first composite region or in the second composite region or in both is characterized by a weight per area of less than 450 g/m$^2$, preferably of less than 430 g/m$^2$, more preferably of less than 410 g/m$^2$, most preferably of less than 380 g/m$^2$.

In one embodiment 13 according to the invention, the sheetlike composite 1 is configured according to any of the preceding embodiments, wherein the first thermoplastic layer B or each further thermoplastic layer B or both is/are characterized by a layer thickness in a range from 0.5 to 3 μm, preferably from 0.5 to 2.5 μm, more preferably from 1 to 2 μm.

In one embodiment 14 according to the invention, the sheetlike composite 1 is configured according to any of the preceding embodiments, wherein the sheetlike composite has been rolled up to form a roll, wherein at least 10, preferably at least 30, more preferably at least 40, laminas of the sheetlike composite lie one on top of another in the roll.

In one embodiment 15 according to the invention, the sheetlike composite 1 is configured according to any of the preceding embodiments, wherein the carrier layer is formed in such a way that a closed container produced by folding and sealing from the sheetlike composite can be autoclaved.

In one embodiment 16 according to the invention, the sheetlike composite 1 is configured according to any of the preceding embodiments, wherein the inner polymer layer comprises a polymer prepared by means of a metallocene catalyst to an extent of 10% to 90% by weight, preferably to an extent of 25% to 90% by weight, more preferably to an extent of 30% to 80% by weight, based in each case on the total weight of the inner polymer layer.

In one embodiment 17 according to the invention, the sheetlike composite 1 is configured according to any of the preceding embodiments, wherein the inner polymer layer comprises a polymer blend, wherein the polymer blend comprises a polymer prepared by means of a metallocene catalyst to an extent of 10 to 90% by weight, preferably to an extent of 25 to 90% by weight, more preferably to an extent of 30 to 80% by weight, and a further polymer to an extent of at least 10% by weight, preferably to an extent of at least 15% by weight, more preferably to an extent of at least 20% by weight, based in each case on the total weight of the polymer blend.

In one embodiment 18 according to the invention, the sheetlike composite 1 is configured according to any of the preceding embodiments, wherein the carrier layer comprises one selected from the group consisting of cardboard, paperboard and paper, or a combination of at least two thereof.

In one embodiment 19 according to the invention, the sheetlike composite 1 is configured according to any of the preceding embodiments, wherein the barrier layer comprises one selected from the group consisting of a plastic, a metal and a metal oxide, or a combination of at least two thereof.

In one embodiment 20 according to the invention, the sheetlike composite 1 is configured according to any of the preceding embodiments, wherein the sheetlike composite further comprises a third composite region, wherein the third composite region comprises, as mutually superposed layers from an outer surface of the third composite region to an inner surface of the third composite region:
   a) the carrier layer,
   b) the barrier layer, and
   c) the inner polymer layer;
wherein the outer surface of the third composite region is a surface of the carrier layer.

A contribution to the achievement of at least one of the objects of the invention is made by an embodiment 1 of a process 1, comprising, as process steps,
   a) providing a sheetlike composite precursor comprising, as mutually superposed layers from an outer surface of the sheetlike composite precursor to an inner surface of the sheetlike composite precursor
      i) a carrier layer,
      ii) a barrier layer, and
      iii) an inner polymer layer,
   b) providing a print image storage means, comprising a surface of the print image storage means;
   c) at least partly wetting the surface of a print image storage means with a thermoplastic composition obtaining a wetted surface of the print image storage means;
   d) contacting the wetted surface of the print image storage means with the outer surface of the sheetlike composite precursor obtaining a sheetlike composite;
wherein, in process step d), 3% to 30%, preferably 5% to 17%, more preferably 9% to 12%, of the outer surface of the sheetlike composite precursor is superimposed with a thermoplastic layer A.

In one embodiment 2 according to the invention, the process 1 is configured according to embodiment 1, wherein the thermoplastic composition is characterized by a colourant content of less than 10% by weight, preferably of less than 5% by weight, more preferably of less than 1% by weight, based in each case on the weight of the thermoplastic composition.

In one embodiment 3 according to the invention, the process 1 is configured according to embodiment 1 or 2, wherein the thermoplastic composition is characterized by a pigment content of less than 10% by weight, preferably of less than 5% by weight, more preferably of less than 1% by weight, based in each case on the weight of the thermoplastic composition.

In one embodiment 4 according to the invention, the process 1 is configured according to any of its preceding embodiments, wherein the process provides a sheetlike composite, wherein a total thickness of the outer layers of the sheetlike composite is in a range from 0.5 to 15 μm, preferably from 1 to 12 μm, more preferably from 3 to 9 μm, wherein the outer layers are all layers which are on a side of the carrier layer remote from the barrier layer, wherein the outer layers include the thermoplastic layer A.

In one embodiment 5 according to the invention, the process 1 is configured according to any of its preceding embodiments, wherein the thermoplastic composition comprises a polyvinyl acetal in a proportion of at least 40% by weight, preferably at least 45% by weight, more preferably at least 50% by weight, more preferably at least 55% by weight, most preferably at least 60% by weight, based in each case on the weight of the thermoplastic composition.

In one embodiment 6 according to the invention, the process 1 is configured according to any of its preceding embodiments, wherein the thermoplastic composition comprises not more than 40% by weight, preferably not more than 35% by weight, more preferably not more than 30% by weight, more preferably not more than 25% by weight, more preferably not more than 20% by weight, more preferably not more than 15% by weight, more preferably not more than 10% by weight, most preferably not more than 5% by weight, based in each case on the weight of the thermoplastic composition, of a polyolefin, preferably polyethylene.

In one embodiment 7 according to the invention, the process 1 is configured according to any of its preceding embodiments, wherein the surface of the print image storage means comprises a multitude of recesses, wherein the thermoplastic composition is introduced into the recesses of the multitude of recesses in process step c).

In one embodiment 8 according to the invention, the process 1 is configured according to embodiment 7, wherein the recesses of the multitude of recesses have a capacity in a range from 10 to 40 ml per $m^2$, preferably from 14 to 36 ml per $m^2$, more preferably from 20 to 30 ml per $m^2$, of the surface of the print image storage means area in each case.

In one embodiment 9 according to the invention, the process 1 is configured according to embodiment 7 or 8, wherein the surface of the print image storage means comprises the multitude of recesses in a recess density in a range from 10 to 60 recesses per cm, preferably from 15 to 55 recesses per cm, more preferably from 20 to 50 recesses per cm, most preferably from 25 to 45 recesses per cm, in each case on a straight line in the surface of the print image storage means.

In one embodiment 10 according to the invention, the process 1 is configured according to any of embodiments 7 to 9, wherein the recesses of the multitude of recesses are cells, wherein one feature selected from the group consisting of a longitudinal diagonal, a transverse diagonal, a depth and a capacity or a combination of at least two thereof among the recesses of the multitude of recesses varies by less than 30%, preferably less than 20%, more preferably less than 10%, most preferably less than 5%. Preferably, the recesses of the multitude of recesses are configured identically.

In one embodiment 11 according to the invention, the process 1 is configured according to any of embodiments 7 to 10, wherein the recesses of the multitude of recesses are cells, wherein the cells are each characterized by a transverse diagonal in a range from 200 to 450 μm, preferably from 220 to 400 μm, more preferably from 240 to 360 μm.

In one embodiment 12 according to the invention, the process 1 is configured according to any of embodiments 7 to 11, wherein the recesses of the multitude of recesses are cells, wherein the cells are each characterized by a longitudinal diagonal in a range from 200 to 450 μm, preferably from 220 to 400 μm, more preferably from 240 to 360 μm.

In one embodiment 13 according to the invention, the process 1 is configured according to any of embodiments 7 to 12, wherein the recesses of the multitude of recesses are cells, wherein the cells are each characterized by a depth in a range from 50 to 150 μm, preferably from 60 to 130 μm, more preferably from 70 to 100 μm.

In one embodiment 14 according to the invention, the process 1 is configured according to any of its preceding embodiments, wherein the process further comprises a process step e), wherein, in process step e), the sheetlike composite is rolled up to form a roll, wherein at least 10, preferably at least 30, more preferably at least 40, laminas of the sheetlike composite lie one on top of another in the roll.

A contribution to the achievement of at least one of the objects of the invention is made by an embodiment 1 of a sheetlike composite 2, obtainable by the process 1 according to any of its embodiments 1 to 14.

A contribution to the achievement of at least one of the objects of the invention is made by an embodiment 1 of a container precursor 1, comprising a precut section of the sheetlike composite 1 according to any of its embodiments 1 to 20, or of the sheetlike composite 2 according to its embodiment 1, wherein the sheetlike composite has been folded at least once, preferably at least twice, more preferably at least 4 times. The container precursor has preferably been formed in one piece from the folded sheetlike composite. In this case, the container precursor has preferably been formed from a single precut section of the sheetlike composite by folding and joining of regions of the sheetlike composite to one another. More particularly, the container precursor preferably does not comprise a lid or base which has not been formed in a one-piece configuration with the sheetlike composite, or both.

A contribution to the achievement of at least one of the objects of the invention is made by an embodiment 1 of a closed container 1, comprising a precut section of the sheetlike composite 1 according to any of its embodiments 1 to 20, or of the sheetlike composite 2 according to its embodiment 1, wherein the sheetlike composite has been folded at least once, preferably at least twice, more preferably at least 4 times, most preferably at least 8 times. The container has preferably been formed in one piece from the folded sheetlike composite. In this case, the container has preferably been formed from a single precut section of the sheetlike composite by folding and joining of regions of the sheetlike composite to one another. More particularly, the container preferably does not comprise a lid or base which has not been formed in a one-piece configuration with the sheetlike composite, or both.

A contribution to the achievement of at least one of the objects of the invention is made by an embodiment 1 of a device 1, comprising an image storage means for intaglio printing, comprising a surface of the image storage means for intaglio printing, wherein the surface of the image storage means for intaglio printing comprises a multitude of recesses, wherein the recesses of the multitude of recesses a) comprise a thermoplastic composition, and
b) have a capacity in a range from 10 to 40 ml per $m^2$, preferably from 14 to 36 ml per $m^2$, more preferably from 20 to 30 ml per $m^2$, of the surface of the image storage means for intaglio printing in each case.

In one embodiment 2 according to the invention, the device 1 is configured according to embodiment 1, wherein the surface of the image storage means for intaglio printing comprises the multitude of recesses in a recess density in a range from 10 to 60 recesses per cm, preferably from 15 to 55 recesses per cm, more preferably from 20 to 50 recesses per cm, most preferably from 25 to 45 recesses per cm, in each case on a straight line in the surface of the image storage means for intaglio printing.

In one embodiment 3 according to the invention, the device 1 is configured according to embodiment 1 or 2, wherein the recesses of the multitude of recesses are cells, wherein one feature selected from the group consisting of a longitudinal diagonal, a transverse diagonal, a depth and a capacity or a combination of at least two thereof among the recesses of the multitude of recesses varies by less than 30%, preferably less than 20%, more preferably less than 10%, most preferably less than 5%. Preferably, the recesses of the multitude of recesses are configured identically.

In one embodiment 4 according to the invention, the device 1 is configured according to any of embodiments 1 to 3, wherein the recesses of the multitude of recesses are cells, wherein the cells are each characterized by a transverse diagonal in a range from 200 to 450 µm, preferably from 220 to 400 µm, more preferably from 240 to 360 µm.

In one embodiment 5 according to the invention, the device 1 is configured according to any of embodiments 1 to 4, wherein the recesses of the multitude of recesses are cells, wherein the cells are each characterized by a longitudinal diagonal in a range from 200 to 450 µm, preferably from 220 to 400 µm, more preferably from 240 to 360 µm.

In one embodiment 6 according to the invention, the device 1 is configured according to any of embodiments 1 to 5, wherein the recesses of the multitude of recesses are cells, wherein the cells are each characterized by a depth in a range from 50 to 150 µm, preferably from 60 to 130 µm, more preferably from 70 to 100 µm.

In one embodiment 7 according to the invention, the device 1 is configured according to any of embodiments 1 to 6, wherein the thermoplastic composition comprises a polyvinyl acetal in a proportion of at least 40% by weight, preferably at least 45% by weight, more preferably at least 50% by weight, more preferably at least 55% by weight, most preferably at least 60% by weight, based in each case on the weight of the thermoplastic composition.

A contribution to the achievement of at least one of the objects of the invention is made by an embodiment 1 of a container precursor 2, surrounding an interior, wherein the container precursor comprises a wall composed of a folded sheetlike composite, wherein the wall comprises a first wall region, a second wall region and a third wall region; wherein the first wall region comprises a first layer sequence comprising, as mutually superposed layers, from the interior outward, a first wall layer, a second wall layer and a third wall layer; wherein the second wall layer is joinded to the third wall layer in the first wall region; wherein the second wall region comprises a second layer sequence comprising, as mutually superposed layers, from the interior outward, the first wall layer, the second wall layer and the third wall layer; wherein the second wall layer is joined to the third wall layer in the second wall region; wherein the third wall region comprises a third layer sequence comprising, as mutually superposed layers, from the inside outward, the first wall layer, a thermoplastic layer A and the third wall layer; wherein the first wall layer is joined via the thermoplastic layer A to the third wall layer in the third wall region; wherein the first wall layer as the first wall layer sequence from the interior outward comprises a first barrier layer and a first carrier layer; wherein the second wall layer as the second layer sequence from the interior outward comprises a second carrier layer and a second barrier layer; wherein the third wall layer as the third layer sequence from the interior outward, comprises a third barrier layer and a third carrier layer; wherein the third carrier layer in the first wall region is characterized by a greater layer thickness than either the second carrier layer or the first carrier layer or both; wherein the second carrier layer in the second wall region is characterized by a smaller layer thickness than either the first carrier layer or the third carrier layer or both; wherein the thermoplastic layer A comprises a polyvinyl acetal in a proportion of at least 40% by weight, preferably at least 45% by weight, more preferably at least 50% by weight, more preferably at least 55% by weight, most preferably at least 60% by weight, based in each case on the weight of the thermoplastic layer A.

In the container precursor 2, the serially numbered carrier layers merge into one another, i.e. together have a one-piece configuration. The layer sequences described arise by virtue of several laminas of the carrier layer being layered one on top of another by folding. This is likewise true of the serially numbered barrier layers and, if present, further serially numbered layers. Thus, the wall layers of the container precursor are 2 laminas of the same sheetlike composite. The wall layers described may further comprise further layers of the sheetlike composite according to the invention at an appropriate position in the layer sequence. For example, an inner polymer layer may be present on a side of the barrier layer having the same number, facing away from the respective carrier layer.

In one embodiment 2 according to the invention, the container precursor 2 is configured according to its embodiment 1, wherein the second layer sequence further comprises the thermoplastic layer A, wherein the first wall layer is joined via the thermoplastic layer A to the second wall layer in the second wall region. It will be apparent here that the first wall region and the second wall region may each only partly comprise the thermoplastic layer A.

In one embodiment 3 according to the invention, the container precursor 2 is configured according to its embodiment 1 or 2, wherein the first wall region adjoins the second wall region.

In one embodiment 4 according to the invention, the container precursor 2 is configured according to any of its embodiments 1 to 3, wherein the third wall region adjoins the second wall region.

In one embodiment 5 according to the invention, the container precursor 2 is configured according to any of its embodiments 1 to 4, wherein the first wall region is characterized by a first width along a circumference of the container precursor, wherein the first width is in a range from 1 to 10 mm, preferably from 1 to 8 mm, more preferably from 2 to 8 mm, more preferably from 2 to 6 mm, most preferably from 3 to 5 mm. Preferably, the first layer sequence has the first width along the circumference of the container precursor.

In one embodiment 6 according to the invention, the container precursor 2 is configured according to any of its embodiments 1 to 5, wherein the second wall region is characterized by a second width along the circumference of the container precursor, wherein the second width is in a range from 1 to 6 mm, preferably from 1 to 5 mm, more preferably from 2 to 4 mm, most preferably from 2 to 3 mm. Preferably, the second layer sequence has the second width along the circumference of the container precursor.

In one embodiment 7 according to the invention, the container precursor 2 is configured according to any of its embodiments 1 to 6, wherein the third wall region is characterized by a third width along the circumference of the container precursor, wherein the third width is in a range from 1 to 12 mm, preferably from 1 to 10 mm, more preferably from 1 to 8 mm, more preferably from 2 to 6 mm, more preferably from 3 to 6 mm, most preferably from 5 to 6 mm.

In one embodiment 8 according to the invention, the container precursor 2 is configured according to any of its embodiments 1 to 7, wherein the layer thickness of the third carrier layer in the first wall region is in each case 1.1 to 20 times, preferably 1.1 to 15 times, more preferably 1.1 to 10 times, more preferably 1.1 to 5 times, more preferably 1.1 to 3 times, more preferably 1.1 to 2 times, more preferably 1.2 to 1.9 times, more preferably still 1.2 to 1.8 times, most preferably 1.3 to 1.7 times, as high as the layer thickness of the first carrier layer or of the second carrier layer or both.

In one embodiment 9 according to the invention, the container precursor 2 is configured according to any of its embodiments 1 to 8, wherein the layer thickness of the second carrier layer in the second wall region is in each case 0.05 to 0.9 times, preferably 0.1 to 0.85 times, more preferably 0.2 to 0.85 times, more preferably 0.3 to 0.85 times, more preferably 0.4 to 0.85 times, more preferably still 0.5 to 0.8 times, most preferably 0.6 to 0.75 times, as high as the layer thickness of the first carrier layer or of the third carrier layer or both.

In one embodiment 10 according to the invention, the container precursor 2 is configured according to any of its embodiments 1 to 9, wherein the first wall layer is not joined, preferably not sealed, to the second wall layer in the first wall region. Preferably, the first wall layer and the second wall layer are in contact, but not joined, in the first wall region. Preferably, in the first wall region, at least 20%, more preferably at least 30%, more preferably at least 40%, more preferably at least 50%, more preferably at least 60%, more preferably at least 70%, more preferably still at least 80%, more preferably still at least 90%, most preferably at least 95%, of a surface of the first wall layer facing the second wall layer is in contact with the second wall layer, and preferably not joined. Further preferably, the first wall layer and the second wall layer are held together by virtue of their being joined to one another in at least one wall region adjacent to the first wall region, preferably merging into one another in a fold.

In one embodiment 11 according to the invention, the container precursor 2 is configured according to any of its embodiments 1 to 10, wherein, in the first wall region, each of
a) a surface of the first carrier layer facing the second carrier layer, and
b) a surface of the second carrier layer facing the first carrier layer
does not comprise any covering layer, preferably any "paper-coating", and is not joinded to any covering layer.

In one embodiment 12 according to the invention, the container precursor 2 is configured according to any of its embodiments 1 to 11, wherein in the second wall region a surface of the second carrier layer facing the first carrier layer does not comprise any covering layer, preferably any "paper-coating", and is not joinded to any covering layer, preferably not to any "paper-coating".

In one embodiment 13 according to the invention, the container precursor 2 is configured according to any of its embodiments 1 to 12, wherein one layer selected from the group consisting of the first carrier layer, the second carrier layer, and the third carrier layer, or a combination of at least two thereof, comprises a material selected from the group consisting of cardboard, paperboard and paper or a combination of at least two thereof.

In one embodiment 14 according to the invention, the container precursor 2 is configured according to any of its embodiments 1 to 13, wherein the thermoplastic layer A comprises not more than 40% by weight, preferably not more than 35% by weight, more preferably not more than 30% by weight, more preferably not more than 25% by weight, more preferably not more than 20% by weight, more preferably not more than 15% by weight, more preferably not more than 10% by weight, most preferably not more than 5% by weight, based in each case on the weight of the thermoplastic layer A, of a polyolefin, preferably polyethylene.

A contribution to the achievement of at least one of the objects of the invention is made by an embodiment 1 of a container precursor 3, surrounding an interior, wherein the container precursor comprises a wall composed of a folded sheetlike composite, wherein the wall comprises a first wall region and a second wall region; wherein the first wall region comprises a first layer sequence comprising, as mutually superposed layers, from the interior outward, a first wall layer, a second wall layer and a third wall layer; wherein the second wall region comprises a second layer sequence comprising, as mutually superposed layers, from the interior outward, the first wall layer, a thermoplastic layer A and the third wall layer; wherein the second wall layer is joined to the third wall layer in the first wall region; wherein the first wall layer is joined via the thermoplastic layer A to the third wall layer in the second wall region; wherein the first wall layer as the first wall layer sequence from the interior outward comprises a first barrier layer and a first carrier layer; wherein the second wall layer as the second wall layer sequence from the interior outward comprises a second carrier layer and a second barrier layer; wherein the third wall layer as the third wall layer sequence from the interior outward comprises a third barrier layer and a third carrier layer; wherein the third carrier layer in the first wall region is characterized by a greater layer thickness than either the first carrier layer or the second carrier layer or both; wherein the thermoplastic layer A comprises a polyvinyl acetal in a proportion of at least 40% by weight, preferably at least 45% by weight, more preferably at least 50% by weight, more preferably at least 55% by weight, most preferably at least 60% by weight, based in each case on the weight of the thermoplastic layer A.

In the container precursor 3, the serially numbered carrier layers merge into one another, i.e. together have a one-piece configuration. The layer sequences described arise by virtue of several laminas of the carrier layer being layered one on top of another by folding. This is likewise true of the serially numbered barrier layers and, if present, further serially numbered layers. Thus, the wall layers of the container precursor are 3 laminas of the same sheetlike composite. The wall layers described may further comprise further layers of the sheetlike composite according to the invention at the position in the layer sequence described for the sheetlike composite. For example, an inner polymer layer may be present on a side of the barrier layer having the same number, facing away from the respective carrier layer.

In one embodiment 2 according to the invention, the container precursor 3 is configured according to its embodiment 1, wherein the thermoplastic layer A comprises not more than 40% by weight, preferably not more than 35% by weight, more preferably not more than 30% by weight, more preferably not more than 25% by weight, more preferably not more than 20% by weight, more preferably not more than 15% by weight, more preferably not more than 10% by weight, most preferably not more than 5% by weight, based in each case on the weight of the thermoplastic layer A, of a polyolefin, preferably polyethylene.

In one embodiment 3 according to the invention, the container precursor 3 is configured according to its embodiment 1 or 2, wherein the first wall region comprises a lower proportion by weight of the thermoplastic layer A, based on the total weight of the thermoplastic layer A, than the second wall region. Preferably, the first wall region does not comprise any part of the thermoplastic layer A.

In one embodiment 4 according to the invention, the container precursor 3 is configured according to any of its embodiments 1 to 3, wherein the layer thickness of the third carrier layer in the first wall region (101) is in each case 1.1 to 20 times, preferably 1.1 to 15 times, more preferably 1.1 to 10 times, more preferably 1.1 to 5 times, more preferably 1.1 to 3 times, more preferably 1.1 to 2 times, more preferably 1.2 to 1.9 times, more preferably still 1.2 to 1.8 times, most preferably 1.3 to 1.7 times, as high as the layer thickness of the first carrier layer or of the second carrier layer or both.

In one embodiment 5 according to the invention, the container precursor 3 is configured according to any of its embodiments 1 to 4, wherein the first wall layer is not joined, preferably not sealed, to the second wall layer in the first wall region. Preferably, the first wall layer and the second wall layer are in contact, but not joined, in the first wall region. Preferably, in the first wall region, at least 20%, more preferably at least 30%, more preferably at least 40%, more preferably at least 50%, more preferably at least 60%, more preferably at least 70%, more preferably still at least 80%, more preferably still at least 90%, most preferably at least 95%, of a surface of the first wall layer facing the second wall layer is in contact with the second wall layer, and preferably not joined. Further preferably, the first wall layer and the second wall layer are held together by virtue of their being joined to one another in at least one wall region adjacent to the first wall region, preferably the second wall region. In the first wall region, the first wall layer, in a further embodiment, may also neither be joined to nor in contact with the second wall layer. In a further embodiment of the invention, the first wall layer and the second wall layer are joined to one another in the first wall region, preferably over at least 20%, more preferably at least 30%, more preferably at least 40%, more preferably at least 50%, more preferably at least 60%, more preferably at least 70%, more preferably still at least 80%, more preferably still at least 90%, most preferably at least 95%, of a surface area of the first wall layer facing the second wall layer.

In one embodiment 6 according to the invention, the container precursor 3 is configured according to any of its embodiments 1 to 5, wherein, in the first wall region, each of
 a) a surface of the first carrier layer facing the second carrier layer, and
 b) a surface of the second carrier layer facing the first carrier layer
does not comprise any covering layer, preferably any "paper-coating", and is not joined to any covering layer, preferably any "paper-coating".

In one embodiment 7 according to the invention, the container precursor 3 is configured according to any of its embodiments 1 to 6, wherein in the second wall region a surface of the second carrier layer facing the first carrier layer does not comprise any covering layer, preferably any "paper-coating", and is not joined to any covering layer, preferably not to any "paper-coating".

In one embodiment 8 according to the invention, the container precursor 3 is configured according to any of its embodiments 1 to 7, wherein one layer selected from the group consisting of the first carrier layer, the second carrier layer, and the third carrier layer, or a combination of at least two thereof, comprises a material selected from the group consisting of cardboard, paperboard and paper or a combination of at least two thereof.

A contribution to the achievement of at least one of the objects of the invention is made by an embodiment 1 of a closed container 2, obtainable by folding the container precursor 1 according to its embodiment 1, the container precursor 2 according to any of its embodiments 1 to 14 or the container precursor 3 according to any of its embodiments 1 to 8 and closing the folded container precursor with a closing tool.

In one embodiment 2 according to the invention, the closed container 2 is configured according to its embodiment 1, wherein the wall surrounds the interior on all sides, wherein the wall consists of the sheetlike composite in one-piece form.

A contribution to the achievement of at least one of the objects of the invention is made by an embodiment 1 of a use 1 of a polyvinyl acetal for joining of a first lamina of a sheetlike composite to a second lamina of the sheetlike composite to form a longitudinal seam of a closed container, wherein the sheetlike composite comprises, as mutually superposed layers,
 a) a carrier layer,
 b) a barrier layer, and
 c) an inner polymer layer.

Preferably, the first lamina and the second lamina of the sheetlike composite each comprise a longitudinal edge of the sheetlike composite. Preferably, the longitudinal edge of the lamina of the sheetlike composite facing the interior of the container has been hemmed. A hemmed edge of the sheetlike composite is produced by scalping a boundary region of the sheetlike composite which is at the edge and then turning over the scalped region. This gives rise to a non-open edge of the sheetlike composite which is protected from moisture and is suitable for being in contact with the foodstuff introduced in the closed container.

Scalping

Scalping is a process step which is known to the person skilled in the art for reducing a layer thickness of a layer, preferably of a carrier layer, more preferably of a carrier layer composed of a material selected from the group consisting of cardboard, paperboard and paper, or a combination of at least two thereof. The scalping is preferably effected with a material-removing tool, preferably with a scalping tool or a splitting tool or both. A further preferred material-removing tool is a rotating tool. A preferred rotating tool is a knife, preferably a circular knife, or a milling tool or both. A further preferred material-removing tool is a knife, preferably a rotating knife, more preferably a circular knife, or a milling tool or both.

Closing Tool

A preferred closing tool is designed for sealing. A further preferred closing tool comprises at least one outlet orifice for a hot gas. A further preferred closing tool comprises a sonotrode or an anvil or both.

Layers

Two layers have been joined to one another when their adhesion to one another extends beyond van der Waals attraction forces. Layers joined to one another are preferably layers selected from the group consisting of mutually sealed, mutually glued and mutually compressed layers, or a combination of at least two thereof. Unless stated otherwise, in a layer sequence, the layers may follow one another indirectly, i.e. with one or at least two interlayers, or directly, i.e. without an interlayer. This is especially the case in the form of words in which one layer superimposes another layer. A form of words in which a layer sequence comprises enumerated layers means that at least the layers specified are present in the sequence specified. This form of words does not necessarily mean that the layers immediately follow one another. A form of words in which two layers adjoin one another means that these two layers lie directly one on top of the other and hence without an interlayer. However, this form of words does not make any stipulation as to whether the two layers are joined to one another or not. Instead, these two layers may be in contact with one another.

Thermoplastic Layer A

The thermoplastic layer A is preferably a sealable thermoplastic layer, more preferably a heat-sealable thermoplastic layer. A preferred thermoplastic layer A comprises less colourant than the first thermoplastic layer B or each further thermoplastic layer B or both. A preferred thermoplastic layer A is designed for joining of a first fold region of the sheetlike composite to a further fold region, wherein the first and further fold regions are delimited from one another by a fold. A further preferred thermoplastic layer A is transparent. A preferred thermoplastic layer A may comprise a synthetic resin, for example a polyol resin or a polyurethane polyol resin or both. In addition, a preferred thermoplastic layer A may comprise one or more fillers in a total proportion of 2% to 50% by weight, preferably of 5% to 30% by weight, more preferably of 10% to 20% by weight, based in each case on the weight of the thermoplastic layer A. A preferred filler is inorganic. A preferred inorganic filler is selected from the group consisting of kaolin, lime and a silicate or a combination of at least two thereof. A further preferred thermoplastic layer A is characterized by a colourant content, preferably a pigment content, of less than 10% by weight, more preferably of less than 5% by weight, most preferably of less than 1% by weight, based in each case on the weight of the thermoplastic layer A.

First Thermoplastic Layer B/Further Thermoplastic Layers B

Preferably, the first thermoplastic layer B adjoins at least one, preferably more than one, further thermoplastic layer B. In this case, preferably each thermoplastic layer B is characterized by a greater proportion of one or more colourants than the thermoplastic layer A. It is further preferable that the first thermoplastic layer B or one of the further thermoplastic layers B in the second composite region directly adjoins the carrier layer. A preferred thermoplastic layer B is a colour layer, preferably a printed colour layer. A preferred printed layer is not continuous in terms of its areal extent, but rather consists of a multitude of halftone pixels. Preferably, the thermoplastic layers B form a decoration.

Polymer Layers

The term "polymer layer" hereinafter relates especially to the inner polymer layer. A preferred polymer, especially for the inner polymer layer, is a polyolefin. The polymer layers may include further constituents. The polymer layers are preferably introduced into or applied to the sheetlike composite material in an extrusion process. The further constituents of the polymer layers are preferably constituents that do not adversely affect the behaviour of the polymer melt on application as a layer. The further constituents may, for example, be inorganic compounds such as metal salts or further plastics such as further thermoplastics. However, it is also conceivable that the further constituents are fillers or pigments, for example carbon black or metal oxides. Suitable thermoplastics for the further constituents especially include those that are easily processible by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and propylene, and very particular preference to polyethylene. Among the polyethylenes, HDPE, MDPE, LDPE, LLDPE, VLDPE and PE and mixtures of at least two thereof are preferred. It is also possible to use mixtures of at least two thermoplastics. Suitable polymer layers have a melt flow rate (MFR) in a range from 1 to 25 g/10 min, preferably in a range from 2 to 20 g/10 min and especially preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and further preferably in a range from 0.900 g/cm$^3$ to 0.970 g/cm$^3$. The polymer layers preferably have at least one melting temperature in a range from 80 to 155° C., preferably in a range from 90 to 145° C. and especially preferably in a range from 95 to 135° C. Preferably, the sheetlike composite comprises, between the barrier layer and the carrier layer, a polymer layer, preferably a polyolefin layer, preferably a polyethylene layer. Further preferably, the composite precursor comprises, between the barrier layer and the carrier layer, a polymer layer, preferably a polyolefin layer, preferably a polyethylene layer. The above remarks relating to the polymer layers also apply to these polymer layers of the composite and the composite precursor.

Inner Polymer Layer

The inner polymer layer is based on thermoplastic polymers, and the inner polymer layer may include a particulate inorganic solid. It is preferable, however, that the inner polymer layer comprises a thermoplastic polymer to an extent of at least 70% by weight, preferably at least 80% by weight and especially preferably at least 95% by weight, based in each case on the total weight of the inner polymer layer. It is further preferable that the inner polymer layer comprises at least 30% by weight, especially preferably at least 40% by weight and most preferably at least 50% by weight, based in each case on the total weight of the inner polymer layer, of a polyolefin prepared by means of a metallocene catalyst, preferably a polyethylene prepared by means of a metallocene catalyst (mPE). Further preferably, the inner polymer layer comprises an mLLDPE.

Preferably, the polymer or polymer mixture of the inner polymer layer has a density (to ISO 1183-1:2004) in a range from 0.900 to 0.930 g/cm$^3$, especially preferably in a range from 0.900 to 0.920 g/cm$^3$ and most preferably in a range from 0.900 to 0.910 g/cm$^3$. The MFR (ISO 1133, 190° C./2.16 kg) is preferably in a range from 4 to 17 g/10 min, especially preferably in a range from 4.5 to 14 g/10 min and most preferably in a range from 6.5 to 10 g/10 min.

Carrier Layer

The carrier layer used may be any material which is suitable for a person skilled in the art for this purpose and which has sufficient strength and stiffness to impart stability to the container to such an extent that the container in the filled state essentially retains its shape. As well as a number of plastics, preference is given to plant-based fibrous materials, especially pulps, preferably limed, bleached and/or unbleached pulps, paper and cardboard being especially preferred. The weight per unit area of the carrier layer is preferably in a range from 120 to 450 g/m$^2$, especially preferably in a range from 130 to 400 g/m$^2$ and most preferably in a range from 150 to 380 g/m$^2$. A more preferred cardboard generally has a single-layer or multilayer structure and may have been coated on one or both sides with one or else more than one covering layer. In addition, a more preferred cardboard has a residual moisture content of less than 20% by weight, preferably of 2% to 15% by weight and especially preferably of 4% to 10% by weight, based on the total weight of the cardboard. A more particularly preferred cardboard has a multilayer structure. Further preferably, the cardboard has, on the surface facing the environment, at least one lamina, but more preferably at least two laminas, of a covering layer known to the person skilled in the art as a "paper-coating". In addition, a more preferred cardboard has a Scott bond value in a range from 100 to 360 J/m$^2$, preferably from 120 to 350 J/m$^2$ and especially preferably from 135 to 310 J/m$^2$. By virtue of the aforementioned ranges, it is possible to provide a composite from which it is possible to fold a container with high integrity, easily and in low tolerances.

Covering Layer

A preferred covering layer is a paper-coating. A paper-coating in papermaking is a covering layer comprising inorganic solid particles, preferably pigments and additives. The paper-coating is preferably applied to a surface of a paper- or carbon-containing layer as a liquid phase, preferably as a suspension or dispersion. A preferred dispersion is an aqueous dispersion. A preferred suspension is an aqueous suspension. A further preferred liquid phase comprises inorganic solid particles, preferably pigments; a binder; and additives. A preferred pigment is selected from the group consisting of calcium carbonate, kaolin, talc, silicate, a plastics pigment and titanium dioxide. A preferred kaolin is a calcined kaolin. A preferred HI calcium carbonate is one selected from the group consisting of marble, chalk and a precipitated calcium carbonate (PCC) or a combination of at least two thereof. A preferred silicate is a sheet silicate. A preferred plastics pigment is spherical, preferably hollow spherical. A more preferred binder is selected from the group consisting of styrene-butadiene, acrylic, acrylonitrile, a starch and a polyvinyl alcohol or a combination of at least two thereof, preference being given to acrylate. A preferred starch is one selected from the group consisting of cationically modified, anionically modified and fragmented starches or a combination of at least two thereof. A preferred additive is one selected from the group consisting of a rheology modifier, a tinting dye, an optical brightener, a carrier for an optical brightener, a flocculating agent, a deaerator and a surface energy modifier or a combination of at least two thereof. A more preferred deaerator is an emulsion paint deaerator, preferably one based on silicone or based on fatty acid or both. A more preferred surface energy modifier is a surfactant.

Barrier Layer

The barrier layer used may be any material which is suitable for a person skilled in the art for this purpose and which has sufficient barrier action, especially with respect to oxygen. The barrier layer is preferably selected from
 a. a plastic barrier layer;
 b. a metal layer;
 c. a metal oxide layer; or
 d. a combination of at least two from a. to c.

If the barrier layer, according to alternative a., is a plastic barrier layer, this preferably comprises at least 70% by weight, especially preferably at least 80% by weight and most preferably at least 95% by weight of at least one plastic which is known to the person skilled in the art for this purpose, especially for aroma or gas barrier properties suitable for packaging containers. Useful plastics, especially thermoplastics, here include N- or O-bearing plastics, either alone or in mixtures of two or more. According to the invention, it may be found to be advantageous when the plastic barrier layer has a melting temperature in a range from more than 155 to 300° C., preferably in a range from 160 to 280° C. and especially preferably in a range from 170 to 270° C.

Further preferably, the plastic barrier layer has a weight per unit area in a range from 2 to 120 g/m², preferably in a range from 3 to 60 g/m², especially preferably in a range from 4 to 40 g/m² and further preferably from 6 to 30 g/m². Further preferably, the plastic barrier layer is obtainable from melts, for example by extrusion, especially laminar extrusion. Further preferably, the plastic barrier layer may also be introduced into the sheetlike composite via lamination. It is preferable in this context that a film is incorporated into the sheetlike composite. In another embodiment, it is also possible to select plastic barrier layers obtainable by deposition from a solution or dispersion of plastics.

Suitable polymers preferably include those having a weight-average molecular weight, determined by gel permeation chromatography (GPC) by means of light scattering, in a range from $3 \times 10^3$ to $1 \cdot 10^7$ g/mol, preferably in a range from $5 \cdot 10^3$ to $1 \cdot 10^6$ g/mol and especially preferably in a range from $6 \cdot 10^3$ to $1 \cdot 10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two thereof, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density in a range from 1.01 to 1.40 g/cm³, preferably in a range from 1.05 to 1.30 g/cm³ and especially preferably in a range from 1.08 to 1.25 g/cm³. It is further preferable that the PA has a viscosity number in a range from 130 to 185 ml/g and preferably in a range from 140 to 180 ml/g.

Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ LR171B types. Preferred EVOHs have at least one, two, more than two or all the following properties:
 an ethylene content in a range from 20 to 60 mol %, preferably from 25 to 45 mol %;
 a density in a range from 1.0 to 1.4 g/cm³, preferably from 1.1 to 1.3 g/cm³;
 a melting point in a range from more than 155 to 235° C., preferably from 165 to 225° C.;
 an MFR value (210° C./2.16 kg when $T_{M(EVOH)}<230°$ C.; 230° C./2.16 kg when 210° C.$<T_{M(EVOH)}<230°$ C.) in a range from 1 to 25 g/10 min, preferably from 2 to 20 g/10 min;
 an oxygen permeation rate in a range from 0.05 to 3.2 cm³·20 µm/m²·day·atm, preferably in a range from 0.1 to 1 cm³·20 nm/m²·day·atm.

Preferably at least one polymer layer, further preferably the inner polymer layer, or preferably all polymer layers, have a melting temperature below the melting temperature of the barrier layer. This is especially true when the barrier layer is formed from polymer. In this case, the melting temperatures of the at least one polymer layer, especially the inner polymer layer, and the melting temperature of the barrier layer differ preferably by at least 1 K, especially preferably by at least 10 K, even more preferably by at least 50 K, further preferably at least 100 K. The temperature difference should preferably be chosen only such that it is sufficiently high that there is no melting of the barrier layer, especially no melting of the polymer barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness in a range from 3 to 20 µm, preferably in a range from 3.5 to 12 µm and especially preferably in a range from 4 to 10 µm.

Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a special configuration, the metal layer consists of aluminium foil. Suitable aluminium foils have a ductility of more than 1%, preferably of more than 1.3% and especially preferably of more than 1.5%, and a tensile strength of more than 30 N/mm$^2$, preferably more than 40 N/mm$^2$ and especially preferably more than 50 N/mm$^2$. Suitable aluminium foils in the pipette test show a droplet size of more than 3 mm, preferably more than 4 mm and especially preferably of more than 5 mm. Suitable alloys for creation of aluminium layers or foils are commercially available under the EN AW 1200, EN AW 8079 or EN AW 8111 names from Hydro Aluminium Deutschland GmbH or Amcor Flexibles Singen GmbH. In the case of a metal foil as barrier layer, it is possible to provide an adhesion promoter layer between the metal foil and a closest polymer layer on one or both sides of the metal foil.

Further preferably, the barrier layer selected, according to alternative c., may be a metal oxide layer. Useful metal oxide layers include all metal oxide layers that are familiar and seem suitable to the person skilled in the art, in order to achieve a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a polymer layer, for example an oriented polypropylene film. A preferred method for this purpose is physical gas phase deposition.

In a further preferred embodiment, the metal layer of the metal oxide layer may take the form of a layer composite composed of one or more polymer layers with a metal layer. Such a layer is obtainable, for example, by vapour deposition of metal on a plastics layer, for example an oriented polypropylene film. A preferred method for this purpose is physical gas phase deposition.

Outer Surface

The outer surface of the sheetlike composite in a composite region is a surface of a lamina of the sheetlike composite which is intended to be in contact with the environment of the container in a container which is to be produced from the sheetlike composite. This does not mean that, in individual regions of the container, outer surfaces of various regions of the composite are not folded against one another or joined to one another, for example sealed to one another. In the specification of a proportion of the outer surface of the sheetlike composite, the proportion is based on the total surface area of the sheetlike composite on a side of the carrier layer remote from the barrier layer. In the specification of a proportion of the outer surface of the body of the closed container or of the surface of the body remote from the interior, this proportion is based on the geometric surface of the body pointing outward.

Inner Surface

The inner surface of the sheetlike composite in a composite region is a surface of a lamina of the sheetlike composite which is intended to be in contact with the contents of the container, preferably a foodstuff, in a container to be produced from the sheetlike composite.

Print Image Storage Means

A more preferred print image storage means is one selected from the group consisting of a print cylinder, a print roller and a print plate or a combination of at least two thereof. A more preferred print cylinder is an intaglio print cylinder or a flexographic print cylinder or both. A preferred print roller is an intaglio print roller or a flexographic print roller or both.

Recesses

A preferred recess is a cell. Cells here are recesses of a print image storage means, wherein the recesses are configured to accommodate a printing ink and release it to a surface to be printed. Preferably, the cells are characterized by a longitudinal diagonal, a transverse diagonal and a depth. In this context, the longitudinal diagonal for a cell of a print roller indicates a maximum extent of the cell along a rotational direction of the print roller. The longitudinal diagonal indicates a maximum extent of the cell along an axial direction of the print roller.

Polyvinyl Acetal

Polyvinyl acetals are thermoplastics which are prepared by reaction of polyvinyl alcohol with aldehydes or ketones. According to the aldehyde used, for example formaldehyde, acetaldehyde or butyraldehyde, a distinction is made between various polyvinyl acetals. Preferred polyvinyl acetals are polyvinyl formal and polyvinyl butyral. A particularly preferred polyvinyl acetal is polyvinyl butyral (PVB).

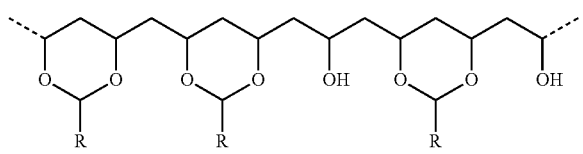

Polyvinyl formal (R = H)
Polyvinyl butyral (R = n-C$_3$H$_7$)

Colourant

According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Adhesion/Adhesion Promoter Layer

An adhesion promoter layer may be present between layers which do not directly adjoin one another. More particularly, an adhesion promoter layer may be present between the barrier layer and the inner polymer layer, and between the barrier layer and the carrier layer.

Useful adhesion promoters in an adhesion promoter layer include all polymers which are suitable for producing a firm bond through functionalization by means of suitable functional groups, through the forming of ionic bonds or covalent bonds with a surface of a respective adjacent layer. Preferably, these are functionalized polyolefins which have been obtained by copolymerization of ethylene with acrylic acids such as acrylic acid, methacrylic acid, crotonic acid, acrylates, acrylate derivatives or carboxylic an hydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel®0609HSA trade names by DuPont or Escor®6000ExCo by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration of the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a cardboard fibre tear in the case of a cardboard as carrier layer.

Polyolefin

A preferred polyolefin is a polyethylene or polypropylene or both. A preferred polyethylene is one selected from the group consisting of an LDPE, an LLDPE, and an HDPE, or a combination of at least two thereof. A further preferred polyolefin is an mPolyolefin. Suitable polyethylenes have a melt flow rate (MFR) in a range from 1 to 25 g/10 min, preferably in a range from 2 to 20 g/10 min and especially preferably in a range from 2.5 to 15 g/10 min, and a density in a range from 0.910 g/cm$^3$ to 0.935 g/cm$^3$, preferably in a range from 0.912 g/cm$^3$ to 0.932 g/cm$^3$, and further preferably in a range from 0.915 g/cm$^3$ to 0.930 g/cm$^3$.

mPolymer

An mPolymer is a polymer which has been prepared by means of a metallocene catalyst. Metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two thereof.

Extrusion

In the extrusion, the polymers are typically heated to temperatures of 210 to 330° C., measured at the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an orifice through which the polymer melt is expressed. The opening may have any shape that allows extrusion of the polymer melt to the composite precursor. For example, the opening may be angular, oval or round. The opening is preferably in the form of a slot of a funnel. In a preferred configuration of the process, application is effected through a slot. The slot preferably has a length in a range from 0.1 to 100 m, preferably in a range from 0.5 to 50 m, especially preferably in a range from 1 to 10 m. In addition, the slot preferably has a width in a range from 0.1 to 20 mm, preferably in a range from 0.3 to 10 mm, especially preferably in a range from 0.5 to 5 mm. During the application of the polymer melt, it is preferable that the slot and the composite precursor move relative to one another. Preference is given to such a process wherein the composite precursor moves relative to the slot.

In a preferred extrusion coating process, the polymer melt is stretched during the application, this stretching preferably being effected by melt stretching, and most preferably by monoaxial melt stretching. For this purpose, the layer is applied to the composite precursor in the molten state by means of a melt extruder, and the layer applied, which is still in the molten state, is subsequently stretched in the preferably monoaxial direction, in order to achieve orientation of the polymer in this direction. Subsequently, the layer applied is left to cool for the purpose of heat-setting. In this context, it is especially preferable that the stretching is effected by at least the following application steps:

b1. emergence of the polymer melt as a melt film through at least one extruder die slot with an emergence rate $V_{out}$;
b2. Application of the melt film to the composite precursor moving relative to the at least one extruder die slot with a movement rate $V_{for}$;

where $V_{out} < V_{for}$. It is especially preferable that $V_{for}$ is greater than $V_{out}$ by a factor in the range from 5 to 200, especially preferably in a range from 7 to 150, further preferably in a range from 10 to 50 and most preferably in a range from 15 to 35. It is preferable here that $V_{pre}$ is at least 100 m/min, especially preferably at least 200 m/min and most preferably at least 350 m/min, but typically not more than 1300 m/min. Once the melt layer has been applied to the composite precursor by means of the above-described stretching process, the melt layer is left to cool down for the purpose of heat-setting, this cooling preferably being effected by quenching via contact with a surface which is kept at a temperature in a range from 5 to 50° C., especially preferably in a range from 10 to 30° C.

In a further preferred configuration, the area which has emerged is cooled down to a temperature below the lowest melting temperature of the polymers provided in this area or its flanks, and then at least the flanks of the area are separated from this area. The cooling can be effected in any manner which is familiar to the person skilled in the art and seems to be suitable. Preference is given here too to the heat-setting which has already been described above. Subsequently, at least the flanks are separated from the area. The separation can be conducted in any manner which is familiar to the person skilled in the art and seems to be suitable. Preferably, the separation is effected by means of a knife, laser beam or waterjet, or a combination of two or more thereof, the use of knives being especially preferable, especially knives for shearing.

Foodstuff

The present sheetlike composite and the container precursor are preferably designed for production of a foodstuff container. In addition, the closed container according to the invention is preferably a foodstuff container. Foodstuffs include all kinds of foodstuffs known to those skilled in the art for human consumption and also animal feeds. Preferred foodstuffs are liquid above 5° C., for example milk products, soups, sauces, non-carbonated drinks Container The container according to the invention may have a multitude of different forms, but preference is given to an essentially cuboid structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used particularly in the top or base regions of the container. In this context, however, it is preferable that the container is formed from the sheetlike composite to an extent of at least 50%, especially preferably to an extent of at least 70% and further preferably to an extent of at least 90% of the area. In addition, the container may have a device for emptying the contents. This may be formed, for example, from plastic and be mounted on the outside of the container. It is also conceivable that this device has been integrated into the container by direct injection moulding. In a preferred configuration, the container according to the invention has at least one edge, preferably from 4 to 22 or else more edges, especially preferably from 7 to 12 edges. Edges in the context of the present invention are understood to mean regions which arise in the folding of a surface. Illustrative edges include longitudinal contact regions between two wall surfaces of the container in each case. In the container, the container walls are preferably the surfaces of the container framed by the edges. Preferably, the interior of a container according to the invention comprises a foodstuff.

Container Precursor

A more preferred container precursor takes the form of a jacket or of a tube or both. A further preferred container precursor comprises an open top region or an open base region or both. In a preferred container precursor, the inner polymer layer is turned inside. A more preferred container precursor consists of a precut section of a sheetlike composite which is folded such that two opposite edges of the sheetlike composite are joined to form a longitudinal seam. Preferably, the longitudinal seam comprises the first wall region and the second wall region, or the first wall region, the second wall region and the third wall region, of the container precursor.

Longitudinal Seam

Figure 11:
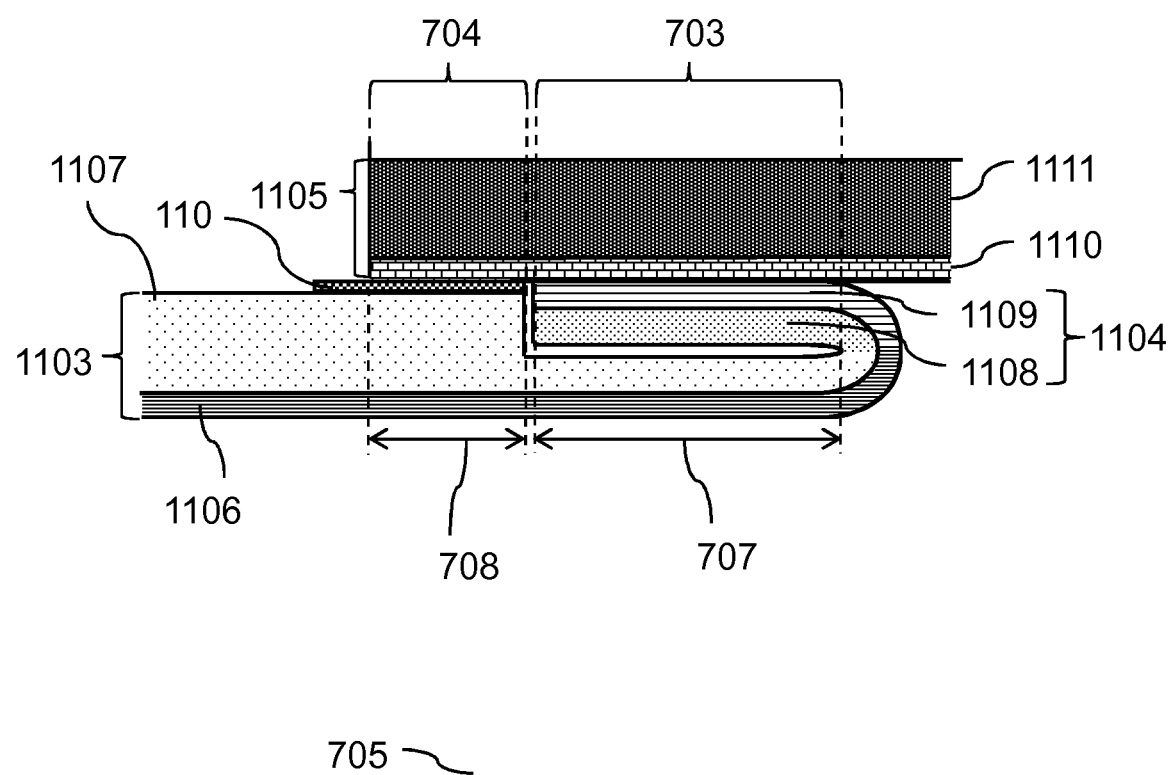

Containers according to the invention comprise the sheetlike composite which has preferably been folded several times, with opposite end regions of the composite having been sealed to one another, in order to first form a precursor of a closed container in the form of a jacket or tube. In this case, the end regions that have been sealed to one another form a longitudinal seam which will also be present in the closed container. This longitudinal seam comprises, both on the inside of the container and on the outside, an abutting edge in the composite where moisture can penetrate into the laminar structure, especially into the carrier layer preferably consisting of cardboard or paperboard. This has to be prevented at least on the inside of the longitudinal seam, since water-containing foodstuffs, for example, are to be stored in the container. According to the invention, this problem is solved by producing a seam at the inner abutting edge. Inventive executions of the seam are shown by FIGS. 11 and 12.

Autoclaving

Autoclaving refers to treatment of a product, usually of a filled and closed container, wherein the product is within a pressure chamber and is heated to a temperature above 100° C., preferably between 100 and 140° C. In addition, the chamber pressure in the pressure chamber is above 1 bar, preferably above 1.1 bar, more preferably above 1.2 bar, more preferably above 1.3 bar, and up to 4 bar. Further preferably, the autoclaving is effected while the product is in contact with steam.

Features of constituents or steps of embodiments of the invention in one category of the invention, especially of the sheetlike composite according to the invention and of the process according to the invention, likewise characterize identical or corresponding constituents or steps in further embodiments of the respective other categories of the invention.

Test Methods

The test methods which follow were utilized in the context of the invention. Unless stated otherwise, the measurements were conducted at an ambient temperature of 25° C., an ambient air pressure of 100 kPa (0.986 atm) and a relative air humidity of 50%.

MFR

MFR is measured in accordance with standard ISO 1133 (unless stated otherwise at 190° C. and 2.16 kg).

Density

Density is measured in accordance with standard ISO 1183-1.

Melting Temperature

Melting temperature is determined using the DSC method ISO 11357-1, -5. The instrument is calibrated according to manufacturer's instructions using the following measurements:

temperature of indium—onset temperature, heat of fusion of indium, temperature of zinc—onset temperature.

Oxygen Permeation Rate

Oxygen permeation rate is determined in accordance with standard ISO 14663-2 Annex C at 20° C. and 65% relative air humidity.

Moisture Content of Cardboard

Moisture content of cardboard is determined in accordance with standard ISO 287:2009.

Adhesion

The adhesion of two adjacent layers is determined by fixing them in a 90° peel test instrument, in for example the Instron "German rotating wheel fixture", on a rotatable roller which rotates at 40 mm/min during the measurement. The samples were previously cut into strips of width 15 mm. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Layer Thickness

A sample of about 2.5 to 3.0 cm×1.0 to 1.5 cm in size is taken from the composite material to be examined. The long side of the sample should be transverse to the running direction of extrusion and the fibre direction of the cardboard. The sample is fixed in a metal clamp which forms a smooth surface. The excess of sample should not be more than 2 to 3 mm. The metal clamp is fixed before the cut is made. In order to obtain a clean cut, especially of the carbon fibres, the part of the sample protruding from the metal clamp is frozen with coolant spray. Subsequently, the latter is removed by means of a disposable blade (from Leica, Microtome Blades). The fixing of the sample in the metal clamp is now loosened such that the sample can be moved out of the metal clamp by about 3 to 4 mm. Subsequently, it is fixed again. For examination in a light microscope (Nikon Eclipse E800), the sample in a sample holder is placed onto the sample stage of the light microscope under one of the objectives (magnification ×2.5; ×5; ×10; ×20; ×50). The appropriate objective should be selected according to the layer thickness of the region to be examined. Exact centring is effected in microscope operation. The light source used in most cases is lateral illumination (swan's neck lighting). If required, additionally or alternatively, reflected illumination of the light microscope is used. If the sample has optimal sharpness and illumination, the individual layers of the composite should be discernible. For documentation and measurements, an Olympus camera (Olympus DP 71) with appropriate image processing software (analySIS) from Analysis is used. This is also used to determine the layer thickness of the individual layers.

Adhesion Strength of Colour Layer

The adhesion strength of a colour layer is understood to mean a resistance of the colour layer to forces that arise when an adhesive strip is torn off the surface of the colour layer. In the test, the adhesive strip used is Tesa 4104 tape, width 20 mm, from the manufacturer Beiersdorf AG, Hamburg. The sample to be tested is placed with the colour layer upward onto a hard, smooth and flat base. According to the test procedure, a strip of the Tesa 4104 tape is stuck onto the outer layer at least over a length of 30 mm and pressed on uniformly by thumb. The test is effected within 30 seconds after the Tesa film has been stuck on. Longer residence times on the outer layer can lead to different results. The test is effected either by a) pulling off the adhesive strip rapidly and continuously at an angle of 90°, or b) pulling off the adhesive strip gradually with a peeling motion (at an angle of less than 45° to the colour layer).

For each of test types a) and b), 3 test runs are conducted at different points on the colour layer. The results are assessed by the naked eye using the scale which follows. The results improve from 1 to 5:

5—colour layer is not pulled off

4—spots of the colour layer are pulled off at distinct points

3—areas of the colour layer are clearly pulled off at distinct points

2—large areas of the colour layer are pulled off

1—colour layer is pulled off completely, relative to the area of the adhesive strip These 6 results are used to form the arithmetic mean, which corresponds the result of the measurement.

Quality of Sealing of the Longitudinal Seam

To determine the quality of the sealing of the longitudinal seam of a container or container precursor, the inner surface of the outer lamina of the sheetlike composite is separated manually from the outer surface of the inner lamina of the sheetlike composite. In the case of the longitudinal seam according to the invention, it is specifically the sealing with the thermoplastic layer A which is separated here. In FIGS. 11 and 12, this corresponds to a separation of the first wall layer 1103 from the third wall layer 1105. In this case, two laminas of the carrier layer of the sheetlike composite in particular are separated. The resultant surfaces of the separated laminas are assessed visually. 3 test runs are conducted in each case. The results are assessed by the naked eye with reference to the following scale:

+ means that cardboard or paper fibres resulting from splitting of a carrier layer are apparent on the resultant surfaces of the separated laminas.

− means that no cardboard or paper fibres resulting from splitting of a carrier layer are apparent on the resultant surfaces of the separated laminas.

The invention is described in more detail hereinafter by examples and drawings, wherein the examples and drawings do not signify any restriction of the invention. Moreover, the drawings, unless stated otherwise, are not to scale.

For the examples (inventive) and comparative examples (noninventive), laminates with the following layer sequences were produced by means of an extrusion coating process which is standard in laminar extrusion processes:

COMPARATIVE EXAMPLE 1

Coloured decoration (thermoplastic layers B)

LDPE Novex ® M19N430 from Ineos Köln GmbH with weight per unit area 22 g/m²

Liquid Packaging Board Stora Enso Natura T Duplex from Stora Enso AG with weight per unit area 210 g/m²

LDPE Novex ® M19N430 from Ineos Köln GmbH with weight per unit area 22 g/m²

Aluminium EN A W 8079 from Hydro Aluminium Deutschland GmbH with layer thickness 6 μm PE blend comprises an mLDPE to an extent of 30% by weight and an LDPE to an extent of 70% by weight, with weight per unit area 22 g/m²

COMPARATIVE EXAMPLE 2

LDPE Novex® M19N430 from Ineos Köln GmbH with weight per unit area 22 g/m²
Coloured decoration (thermoplastic layers B)
Liquid Packaging Board Stora Enso Natura T Duplex from Stora Enso AG with weight per unit area 210 g/m²
LDPE Novex® M19N430 from Ineos Köln GmbH with weight per unit area 22 g/m²
Aluminium EN A W 8079 from Hydro Aluminium Deutschland GmbH with layer thickness 6 μm
PE blend comprises an mLDPE to an extent of 30% by weight and an LDPE to an extent of 70% by weight, with weight per unit area 22 g/m²

EXAMPLES 1 TO 4 AND COMPARATIVE EXAMPLE 3

70% by weight of PVB, 10% by weight of polyol resin and 20% by weight of mPE (thermoplastic layer A)
Coloured decoration (thermoplastic layers B)
Liquid Packaging Board Stora Enso Natura T Duplex from Stora Enso AG with weight per unit area 210 g/m²
LDPE Novex® M19N430 from Ineos Köln GmbH with weight per unit area 22 g/m²
Aluminium EN A W 8079 from Hydro Aluminium Deutschland GmbH with layer thickness 6 μm
PE blend comprises an mLDPE to an extent of 30% by weight and an LDPE to an extent of 70% by weight, with weight per unit area 22 g/m²

In the above examples and comparative examples, the coloured decoration was produced in each case by intaglio printing with VB67 printing ink from Siegwerk Druckfarben AG, Siegburg. In addition, the thermoplastic layer A was likewise applied by intaglio printing. In this case, the thermoplastic layer A in Examples 1 to 4 and Comparative Example 3 was applied in the region of the laminate which constitutes a longitudinal seam in the container. This sealing region between laminas of the laminate in the longitudinal seam has an area of 20 cm². The thermoplastic layer A does not contain any colourant.

Figure 8:
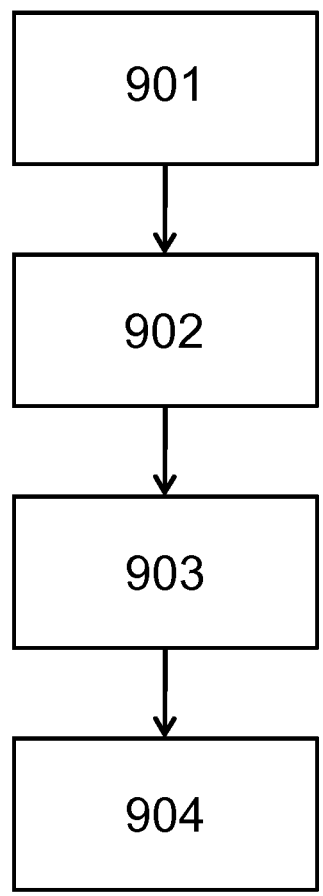

In the examples and comparative examples, the above laminates were used to produce close containers of the form shown in FIG. 8 ("Briktype").

Evaluation

|  | Layer thickness of thermoplastic layer A [μm] | Layer thickness of coloured decoration [μm] |
|---|---|---|
| Comparative Example 1 | 0 | 3 |
| Comparative Example 2 | 0 | 3 |
| Comparative Example 3 | 3 | 6 |
| Example 1 | 10 | 3 |
| Example 2 | 15 | 2 |
| Example 3 | 20 | 1 |
| Example 4 | 20 | 3 |

|  | Container weight [g] | Sealing quality of the longitudinal seam | Adhesion strength of coloured decoration | Grippiness |
|---|---|---|---|---|
| Comparative Example 1 | 28 | − | 2 | − |
| Comparative Example 2 | 28 | + | 5 | −− |
| Comparative Example 3 | 27 | − | 5 | + |
| Example 1 | 25 | + | 5 | ++ |
| Example 2 | 25.5 | + | 5 | ++ |
| Example 3 | 25.8 | + | 5 | ++ |
| Example 4 | 26 | + | 5 | ++ |

The above meanings for the grippiness of the container with moisture condensed thereon are as follows:
−− very slippy,
− slippy,
+ good grippability,
++ very good grippability.

Figure 2:
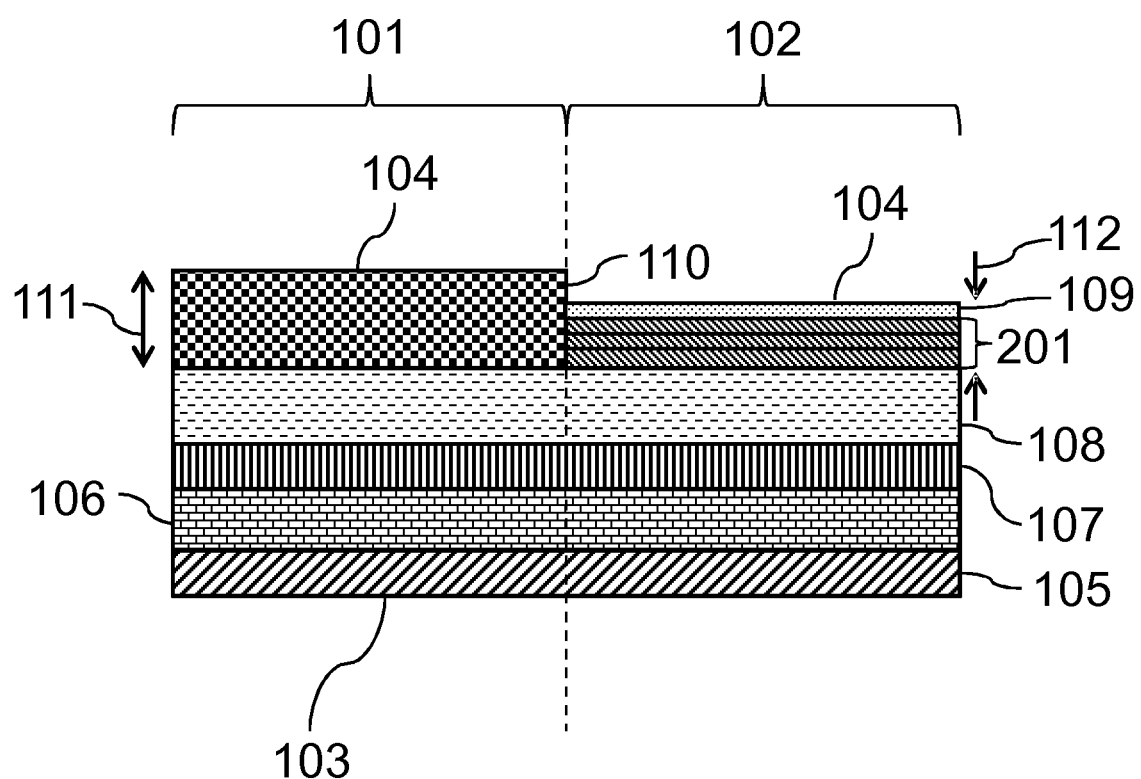
Figure 3:
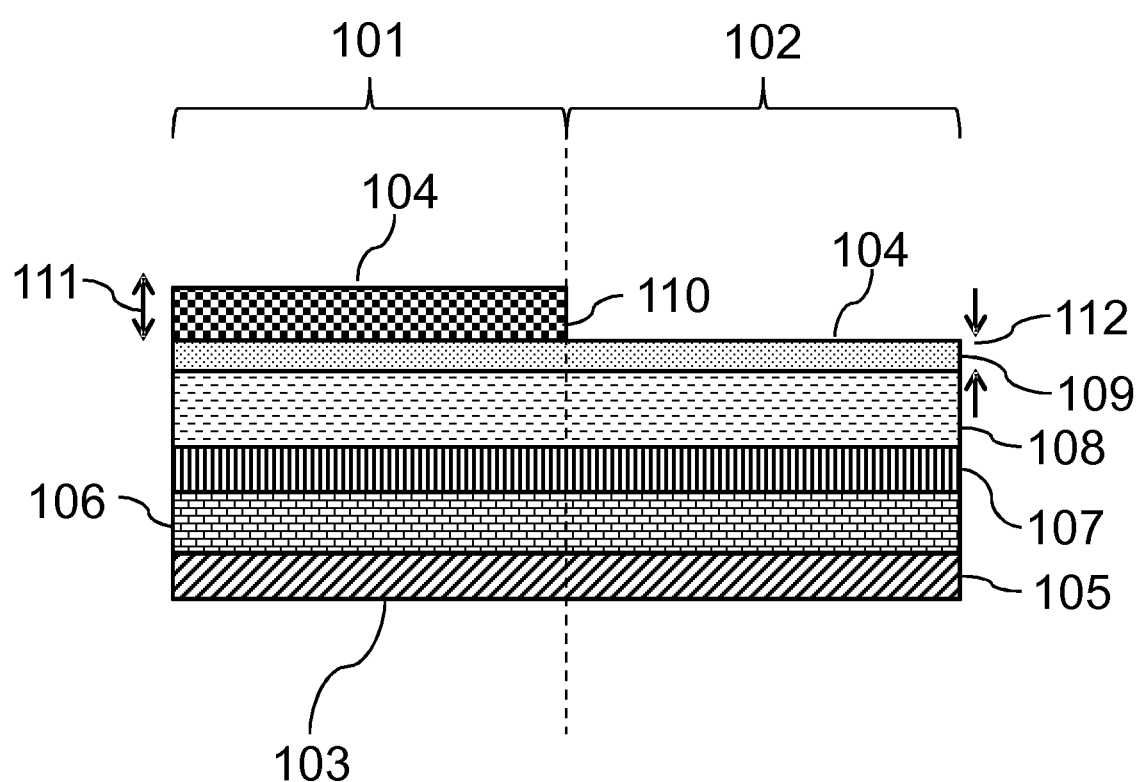
Figure 4:
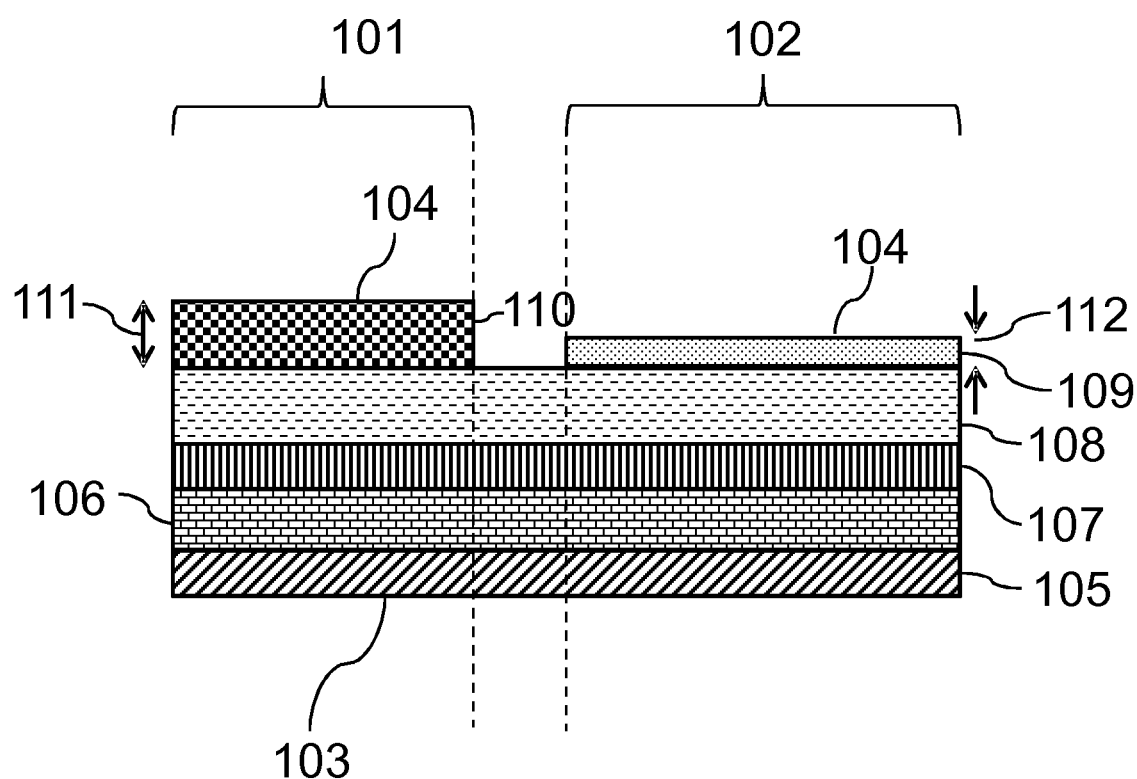
Figure 5:
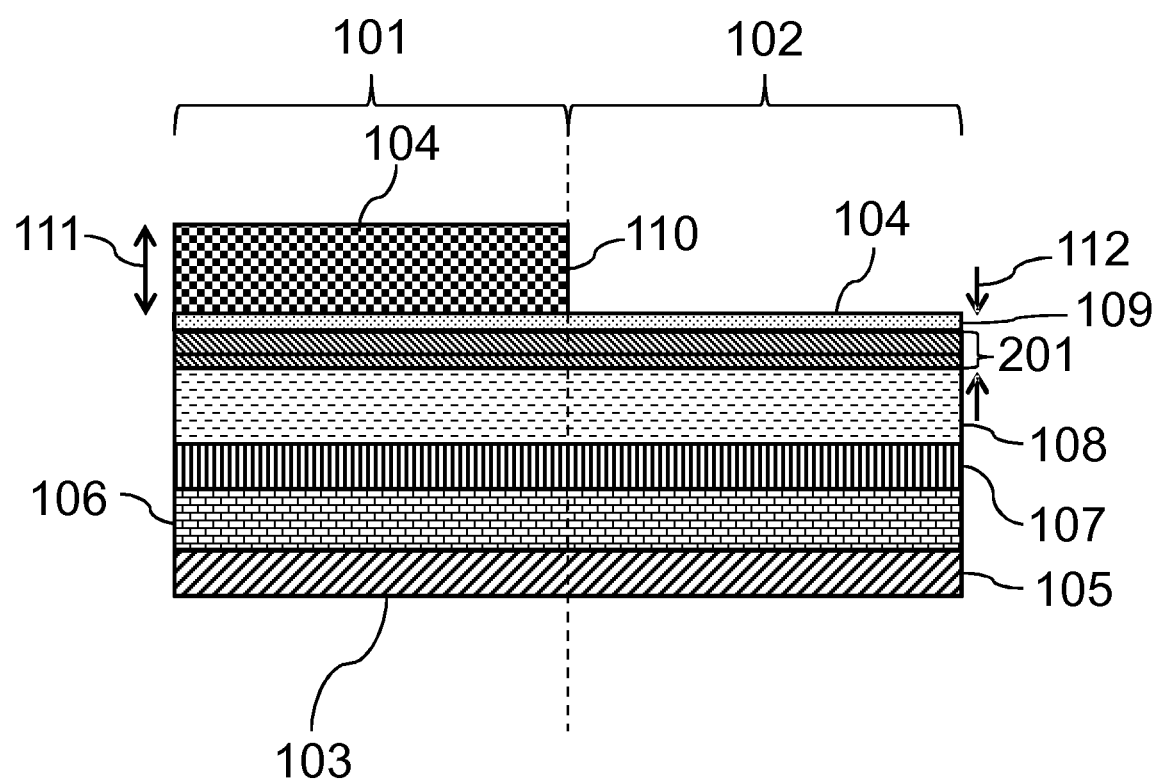
Figure 6:
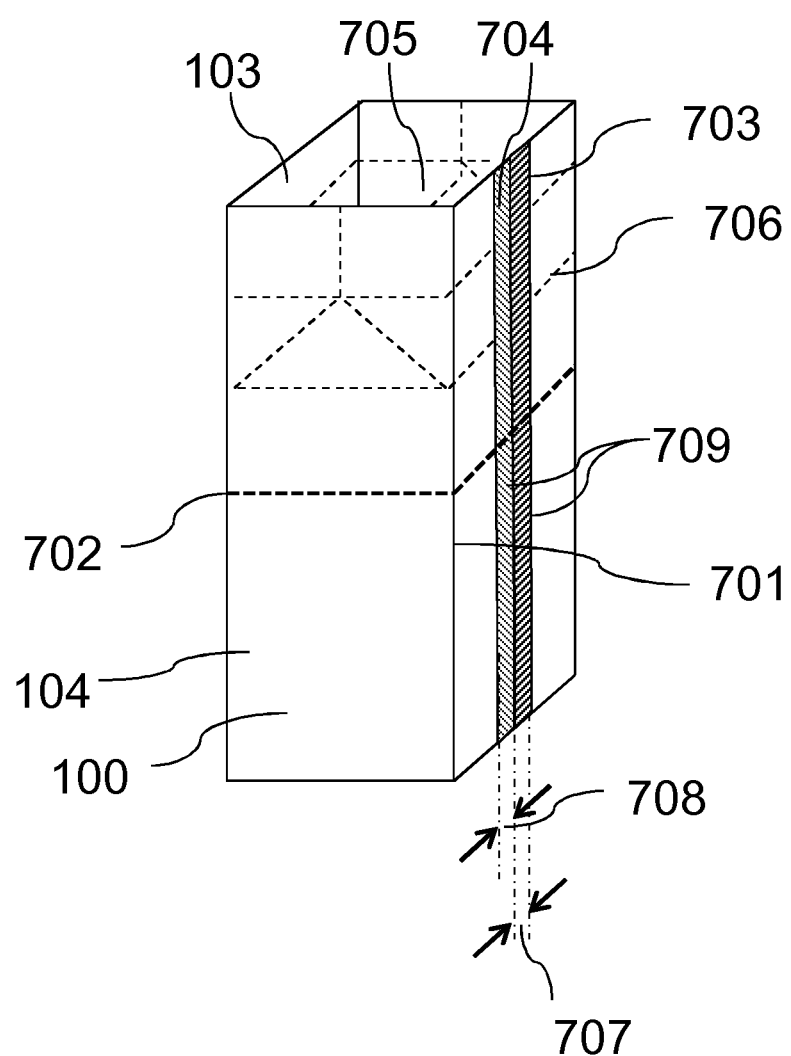
Figure 7:
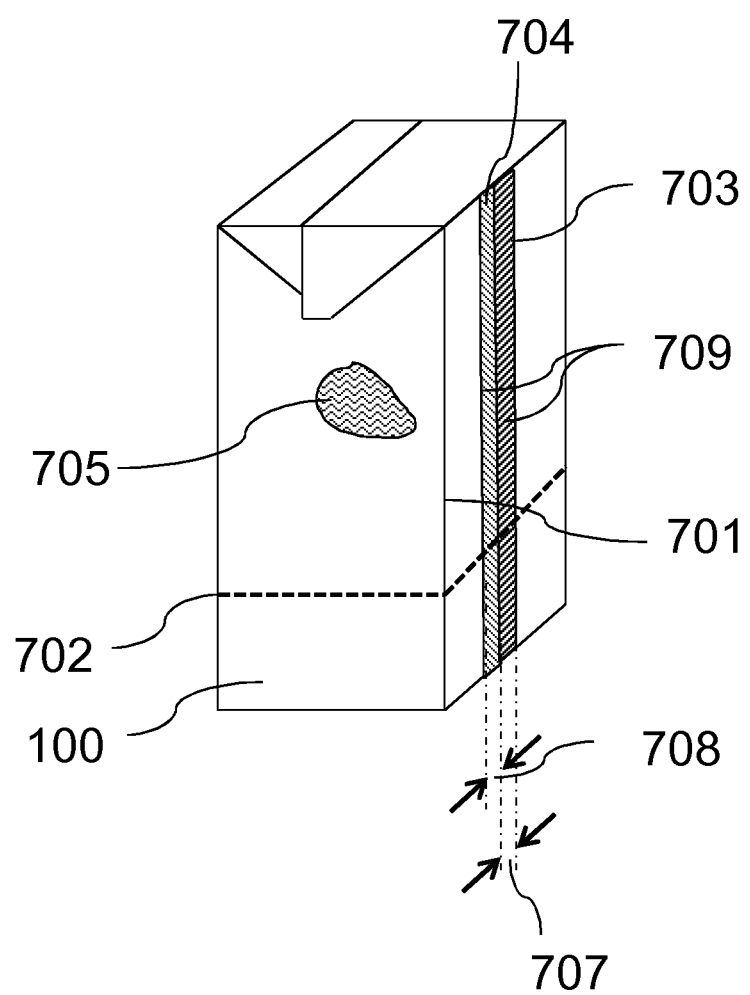
Figure 9:
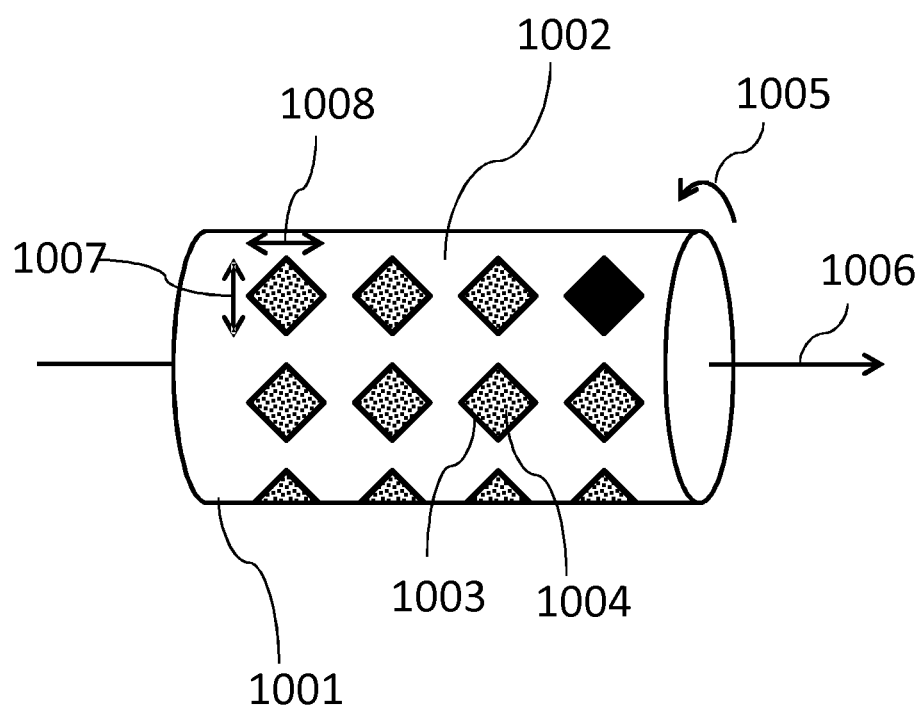
Figure 10:
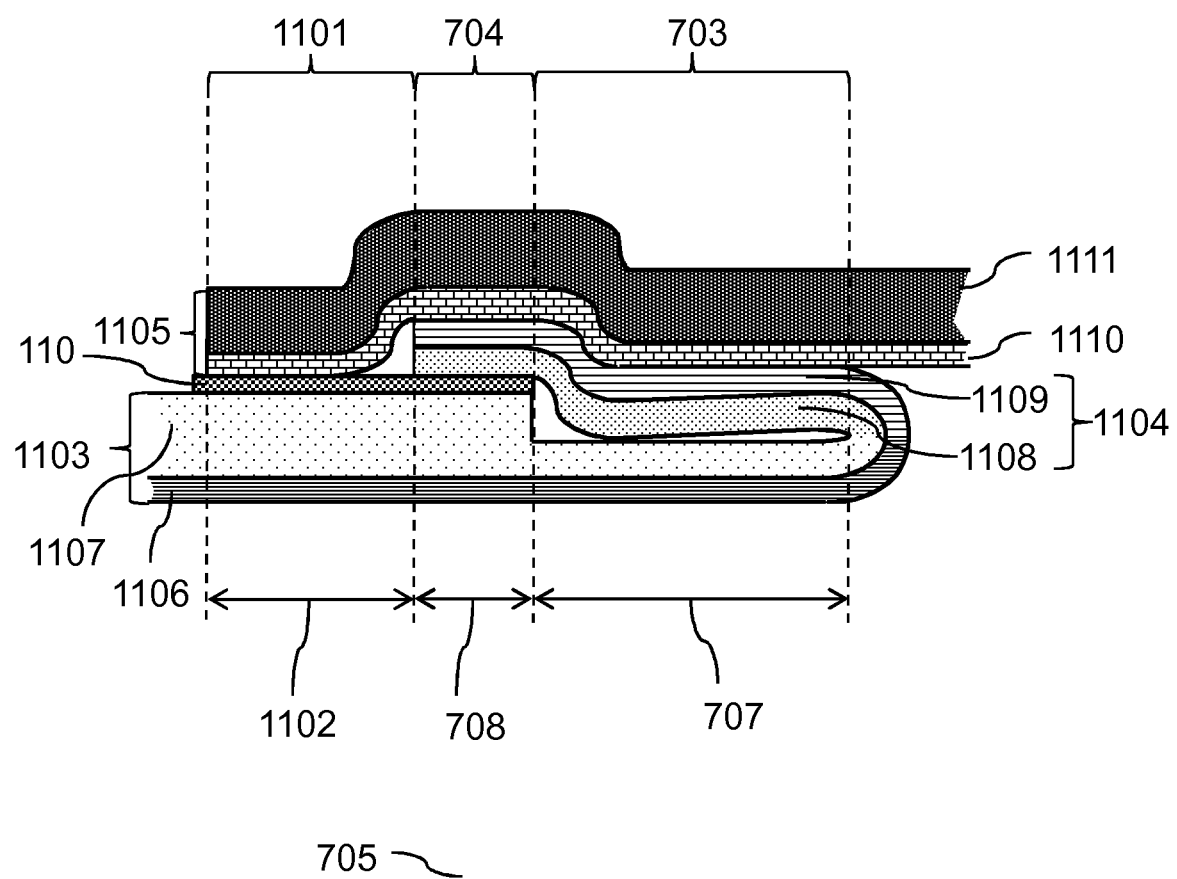

The figures show, in schematic form and not to scale:
FIG. 1 a schematic cross-sectional diagram of a section of a sheetlike composite according to the invention;
FIG. 2 a schematic cross-sectional diagram of a section of a further sheetlike composite according to the invention;
FIG. 3 a schematic cross-sectional diagram of a section of a further sheetlike composite according to the invention;
FIG. 4 a schematic cross-sectional diagram of a section of a further sheetlike composite according to the invention;
FIG. 5 a schematic cross-sectional diagram of a section of a further sheetlike composite according to the invention;
FIG. 6 a schematic diagram of a container precursor according to the invention;
FIG. 7 a schematic diagram of a closed container according to the invention;
FIG. 8 a flow diagram of a process according to the invention for printing a composite precursor;
FIG. 9 a schematic diagram of a device according to the invention;
FIG. 10 a schematic cross-sectional diagram of a section of a wall of a container precursor according to the invention; and
FIG. 11 a schematic cross-sectional diagram of a section of a wall of a further container precursor according to the invention.

FIG. 1 shows a schematic cross-sectional diagram of a section of a sheetlike composite according to the invention 100. The sheetlike composite 100, represented in the form of a section, comprises a first composite region 101 and a second composite region 102, wherein the first composite region 101 adjoins the second composite region 102. The two composite regions are directly alongside one another. The first composite region 101 comprises, as mutually superposed layers from an outer surface 104 of the first composite region 101 to an inner surface 103 of the first composite region 101: a thermoplastic layer A 110, a carrier layer 108, a polyethylene layer 107, a barrier layer 106, and an inner polymer layer 105. The outer surface 104 of the first composite region 101 is a surface of the thermoplastic layer A 110. The second composite region 102 comprises, as mutually superposed layers from an outer surface 104 of the second composite region 102 to an inner surface 103 of the second composite region 102: a first thermoplastic layer B 109, the carrier layer 108, the polyethylene layer 107, the barrier layer 106; and the inner polymer layer 105. At the same time, the outer surface 104 of the second composite region 102 is a surface of the first thermoplastic layer B 109. The outer surfaces 104, in a container 800 formed from the sheetlike composite 100, are designed to face an environment of the container 800. In the container 800, the inner surface 103 is designed to be in contact with a foodstuff 801 filled into an interior 801 of the container 800. The thermoplastic layer A 110 consists to an extent of 70% by weight, based on the weight of the thermoplastic layer A 110, of polyvinyl butyral (PVB) and to an extent of 10% by weight, based on the weight of the thermoplastic layer A 110, of a polyol resin. The thermoplastic layer A 110 is heat-sealable and is especially suitable for joining a fold-over excess 802 of a container 800 formed from the sheetlike composite 100 to a body 803 of the container 800 by sealing. Moreover, the thermoplastic layer A 110 is transparent. The first thermoplastic layer B 109 is an colour layer consisting of pigments in a proportion of 22% by weight, based on the weight of the first thermoplastic layer B 109. Moreover, the first thermoplastic layer B 109 forms a decoration of the sheetlike composite 100. The carrier layer 108 has a weight per unit area of 210 g/m² and consists of the Liquid Packaging Board Stora Enso Natura T Duplex from Stora Enso AG. The carrier layer 108 is characterized by a double paper-coating, a Scott bond value of 200 J/m² and a residual moisture content of 7.5%. The polyethylene layer 107 is characterized by a weight per unit area of 22 g/m² and consists of an LDPE. Between the polyethylene layer 107 and the barrier layer 106, there may be a further layer (not shown), which consists to an extent of 100% by weight of Novex® M21N430 from Ineos Köln GmbH and has a weight per unit area of 3 g/m². The barrier layer 106 has a layer thickness of 6 μm and consists of the aluminium EN A W 8079 from Hydro Aluminium Deutschland GmbH. Between the barrier layer 106 and the inner polymer layer 105, an adhesion promoter layer (not shown) may be present, having, for example, a weight per unit area of 90 g/m² and a layer thickness of 100 μm and consisting of 50% by weight each, based on the total weight of the adhesion promoter layer, of Escor™ 5100 from Exxon Mobil Corporation and Novex® M21N430 from Ineos Köln GmbH. In this case, the adhesion promoter layer was produced by coextrusion. The inner polymer layer 105 has a weight per unit area of 22 g/m² and a layer thickness of 24 μm, and consists of a PE blend. The PE blend comprises an mLDPE to an extent of 80% by weight and an LDPE to an extent of 20% by weight, based in each case on the PE blend. A total layer thickness of all layers of the sheetlike composite 100 that are on a side of the carrier layer 108 remote from the barrier layer 106 in the first composite region 101, i.e. solely a layer thickness 111 of the thermoplastic layer A 110 here, is 8 μm. A total thickness of all layers of the sheetlike composite 100 that are on a side of the carrier layer 108 remote from the barrier layer 106 in the second composite region 102, i.e. solely a layer thickness 112 of the first thermoplastic layer B 109 here, is 1 μm. It can also be inferred from FIG. 1 that the second composite region 102 does not comprise any part of the thermoplastic layer A 110.

FIG. 2 shows a schematic cross-sectional diagram of a section of a further sheetlike composite 100 according to the invention. The sheetlike composite 100 according to FIG. 2 is the sheetlike composite according to FIG. 1, except that, according to FIG. 2, there are three further thermoplastic layers B 201 between the first thermoplastic layer B 109 and the carrier layer 108. These further thermoplastic layers B 201 are colour layers which form part of the decoration of the sheetlike composite 100. The further thermoplastic layers B 201 each consist to an extent of 10% by weight of organic pigments, based on the weight of the respective further thermoplastic layer B 201. A total thickness of all layers of the sheetlike composite 100 that are on a side of the carrier layer 108 remote from the barrier layer 106 in the first composite region 101, i.e. solely a layer thickness 111 of the thermoplastic layer A 110 here, is 10 μm. A total thickness of all layers of the sheetlike composite 100 that are on a side of the carrier layer 108 remote from the barrier layer 106 in the second composite region 102, i.e. a total layer thickness 112 of the first thermoplastic layer B 110 and the further thermoplastic layers B 201 here, is 4 μm.

FIG. 3 shows a schematic cross-sectional diagram of a section of a further sheetlike composite 100 according to the invention. The sheetlike composite 100 according to FIG. 3 is the sheetlike composite according to FIG. 1, except that, according to FIG. 3, the sheetlike composite 100 further comprises the first thermoplastic layer B 109 between the thermoplastic layer A 110 and the carrier layer 108 in the first composite region 101. Thus, the first thermoplastic layer B 109 extends at least over the first composite region 101 and the second composite region 102. Accordingly, the total thickness of all layers of the sheetlike composite 100 that are on a side of the carrier layer 108 remote from the barrier layer 106 in the first composite region 101 is the sum total of the layer thickness 111 of the thermoplastic layer A 110 and the layer thickness 112 of the first thermoplastic layer B 109 and is 9 μm.

FIG. 4 shows a schematic cross-sectional diagram of a section of a further sheetlike composite 100 according to the invention. The sheetlike composite 100 according to FIG. 4 is the sheetlike composite according to FIG. 1, except that, according to FIG. 4, the first composite region 101 and the second composite region 102 do not adjoin one another. Instead, between the first composite region 101 and the second composite region 102, there is a region of the sheetlike composite which comprises neither a thermoplastic layer B 109, 201 nor the thermoplastic layer A 110.

FIG. 5 shows a schematic cross-sectional diagram of a section of a further sheetlike composite 100 according to the invention. The sheetlike composite 100 according to FIG. 5 is the sheetlike composite according to FIG. 1, except that, according to FIG. 5, there are two further thermoplastic layers B 201 between the first thermoplastic layer B 109 and the carrier layer 108. These further thermoplastic layers B 201 are colour layers which form part of the decoration of the sheetlike composite 100. The further thermoplastic layers B 201 each consist to an extent of 10% by weight of organic pigments, based on the weight of the respective further thermoplastic layer B 201. In addition, the first thermoplastic layer B 109 and the two further thermoplastic layers B 201 are between the thermoplastic layer A 110 and the carrier layer 108 in the first composite region 101. A total thickness of all layers of the sheetlike composite 100 that are on a side of the carrier layer 108 remote from the barrier layer 106 in the first composite region 101, i.e. the sum total of the layer thickness 111 of the thermoplastic layer A 110 and the total layer thickness 112 of the first thermoplastic layer B 109 and the two further thermoplastic layers B 201 here, is 13 μm. A total thickness of all layers of the sheetlike composite 100 that are on a side of the carrier layer 108 remote from the barrier layer 106 in the second composite region 102, i.e. the total layer thickness 112 of the first thermoplastic layer B 110 and the further thermoplastic layers B 201 here, is 3 μm.

FIG. 6 shows a schematic diagram of a container precursor 700 according to the invention, comprising a precut section of the sheetlike composite 100 according to FIG. 1. The sheetlike composite 100 here has been folded 4 times, and accordingly comprises 4 folds 701. These folds 701 each constitute an edge 701, especially a longitudinal edge, of the container precursor 700. By folding along creases 706 and joining fold regions of the container precursor 700, it is possible to form a closed container 800. The container precursor 700 shown in the form of a jacket surrounds an interior 705, with the inner surface 103 of the sheetlike composite 100 facing the interior 705. The outer surface 104 faces an environment of the container precursor 700. The container precursor 700 comprises a longitudinal seam 709 comprising a first composite region 703 and a further composite region 704. The first composite region 703 and the second composite region 704 are shown in cross section in FIG. 12. The first composite region 703 has a first width 707 of 5 mm along a circumference 702 of the container precursor 700. The second composite region 704 has a second width 708 of 3 mm along the circumference 702 of the container precursor 700. The longitudinal seam 709 was produced by stripping the carrier layer 108, folding the sheetlike composite 100 and sealing to the thermoplastic layer A 110.

FIG. 7 shows a schematic diagram of a closed container 800 according to the invention. The closed container 800 was produced from the container precursor 700 according to FIG. 6. In addition, the closed container 800 surrounds an interior 705 comprising a foodstuff. The closed container 800 additionally comprises the longitudinal seam 709 as described for the container precursor 700 in FIG. 6.

FIG. 8 shows a flow diagram of a process 900 according to the invention for printing a composite precursor. The process comprises a process step a) 901: providing a sheetlike composite precursor comprising, as mutually superposed layers from an outer surface of the sheetlike composite precursor to an inner surface of the sheetlike composite precursor, a first thermoplastic layer B 109, a carrier layer 108, a polyethylene layer 107, a barrier layer 106, and an inner polymer layer 105. These layers are the corresponding layers of the sheetlike composite 100 according to FIG. 3. The outer surface of the sheetlike composite precursor is a surface of the first thermoplastic layer B 109. In process step b) 902 of the process 900, a print image storage means 1001, an intaglio printing roller here, is provided. The intaglio printing roller comprises a surface of a print image storage means 1002, which in turn comprises a multitude of recesses 1003, cells here. In a process step c) 903, a thermoplastic composition 1004 is introduced into the cells and hence the surface of the print image storage means 1002 is wetted obtaining a wetted surface of a print image storage means 1002. The thermoplastic composition 1004 consists of PVB to an extent of 70% by weight, based on the weight of the thermoplastic composition 1004, and of a polyol resin to an extent of 10% by weight, based on the weight of the thermoplastic composition 1004. In a process step d) 904, the wetted surface of the print image storage means 1002 is pressed onto the outer surface of the sheetlike composite precursor. For this purpose, the composite precursor is guided over and pressed onto the rotating intaglio printing roller. By printing the composite precursor, the sheetlike composite 100 according to FIG. 3 is obtained. In this case, 4% of the total outer surface area of the sheetlike composite precursor is superimposed with the thermoplastic layer A 110.

FIG. 9 shows a schematic diagram of a device 1000 according to the invention. The device 1000 comprises a print image storage means 1001 with a surface of the print image storage means 1002. The print image storage means 1001 is the intaglio printing roller which is used in the process 900 according to FIG. 8. The same applies to the thermoplastic composition 1004. The intaglio printing roller rotates in a direction of rotation 1005 about an axis which defines an axial direction 1006. The recesses 1003, cells here, are characterized by a longitudinal diagonal of 310 μm, a transverse diagonal of 350 μm, a depth of 92 μm and a capacity of 28 ml per m$^2$ of the surface of the print image storage means 1002. The cells of the surface of the print image storage means 1002 are all identical. Moreover, the surface of the print image storage means 1002 is characterized by a cell density of 40 recesses per cm in a straight line on the surface of the print image storage means 1002.

FIG. 10 shows a schematic cross-sectional diagram of a section of a wall 1100 of a container precursor 700 according to the invention. The container precursor 700 and its wall 1100 surround an interior 705. The wall 1100 consists of a one-piece folded sheetlike composite 100 constructed as shown in FIG. 1. The wall 1100 comprises a first wall region 703, a second wall region 704 and a third wall region 1101. The first wall region 703 comprises a first layer sequence comprising, as mutually superposed layers, from the interior 705 outward, a first wall layer 1103, a second wall layer 1104 and a third wall layer 1105. In the first wall region 703, the second wall layer 1104 is joined to the third wall layer 1105, more specifically sealed to one another via the inner polymer layers 105 that lie one on top of another here (not shown, cf. FIG. 1). The second wall region 704 comprises a second layer sequence comprising, as mutually superposed layers, from the interior 705 outward, the first wall layer 1103, the thermoplastic layer A 110, the second wall layer 1104 and the third wall layer 1105. In the second wall region 704, the first wall layer 1103 is joined to the second wall layer 1104 by sealing via the thermoplastic layer A 110, and the second wall layer 1104 is joined to the third wall layer 1105 by a sealing join via the inner polymer layers 105 that lie one on top of another here (not shown, cf. FIG. 1). The third wall region 1101 comprises a third layer sequence comprising, as mutually superposed layers, from the interior 705 outward, the first wall layer 1103, the thermoplastic layer A 110 and the third wall layer 1105. In the third wall region 1101, the first wall layer 1103 is joined to the third wall layer 1105 by sealing via the thermoplastic layer A 110. The first wall layer 1103 comprises, as the first wall layer sequence, from the interior 705 outward, a first barrier layer 1106 and a first carrier layer 1107. The second wall layer 1104 comprises, as the second wall layer sequence, from the interior 705 outward, a second carrier layer 1108 and a second barrier layer 1109. The third wall layer 1105 comprises, as the third wall layer sequence, from the interior 705 outward, a third barrier layer 1110 and a third carrier layer 1111. In addition, the wall layers 1103, 1104, 1105 each comprise, between a barrier layer and a carrier layer, a polyethylene layer 107 and the already mentioned inner polymer layers 105 as described for FIG. 1. In the first wall region 703, the second carrier layer 1108 and the first carrier layer 1107 each have a layer thickness of 65% of the layer thickness of the third carrier layer 1111. Here, the second carrier layer 1108 and the first carrier layer 1107 are scalped and the third carrier layer 1111 is unscalped. In the second wall region 704, the second carrier layer 1108 has a layer thickness of 65% each of the first carrier layer 1107 and of the third carrier layer 1111. Accordingly, here, only the second carrier layer 1108 is scalped. The composition of the thermoplastic layer A 110 is as described for FIG. 1. The first wall region 703, the second wall region 704 and the third wall region 1101 here form a longitudinal seam 709 of the container precursor 700. The first carrier layer 1107, the second carrier layer 1108 and the third carrier layer 1111 together are configured in one-piece form and form laminas of the carrier layer 108 which merge into one another at folds. The first barrier layer 1106, the second barrier layer 1109 and the third barrier layer 1110 together are likewise configured in one-piece form and form laminas of the barrier layer 106 which merge into one another at folds.

FIG. 11 shows a schematic cross-sectional diagram of a section of a wall 1100 for a further container precursor 700 according to the invention. The container precursor 700 is that shown in FIG. 6. The container precursor 700 and its wall 1100 surround an interior 705. The wall 1100 consists of the one-piece folded sheetlike composite 100 from FIG. 1. The wall 1100 comprises a first wall region 703 and a second wall region 704. The first wall region 703 comprises a first layer sequence comprising, as mutually superposed layers, from the interior 705 outward, a first wall layer 1103, a second wall layer 1104 and a third wall layer 1105. The second wall region 704 comprises a second layer sequence comprising, as mutually superposed layers, from the interior 705 outward, the first wall layer 1103, the thermoplastic layer A 110 and the third wall layer 1105. In the first wall region 703, the second wall layer 1104 is joined to the third wall layer 1105 by sealing with the inner polymer layers 105 that lie one on top of another here (not shown, cf. FIG. 1). In the second wall region 704, the first wall layer 1103 is joined via the thermoplastic layer A 110 to the third wall layer 1105 by sealing. The first wall layer 1103 comprises, as the first wall layer sequence, from the interior 705 outward, a first barrier layer 1106 and a first carrier layer 1107. The second wall layer 1104 comprises, as the second wall layer sequence, from the interior 705 outward, a second carrier layer 1108 and a second barrier layer 1109. The third wall layer 1105 comprises, as the third layer sequence, from the interior 705 outward, a third barrier layer 1110 and a third carrier layer 1111. In addition, the wall layers each comprise the respective layers specified in FIG. 1, especially the polyethylene layer 107 and the inner polymer layer 105. In the first wall region 703, the second carrier layer 1108 and the first carrier layer 1107 each have a layer thickness of 65% of the layer thickness of the third carrier layer 1111. Here, the second carrier layer 1108 and the first carrier layer 1107 are scalped and the third carrier layer 1111 is unscalped. In the second wall region 704, none of the carrier layers 1107, 1111 is scalped. The composition of the thermoplastic layer A 110 is as described for FIG. 1. The first wall region 703 and the second wall region 704 here form the longitudinal seam 709 of the container precursor 700 from FIG. 6. The first carrier layer 1107, the second carrier layer 1108 and the third carrier layer 1111 together are configured in one-piece form and form laminas of the carrier layer 108 which merge into one at folds. The first barrier layer 1106, the second barrier layer 1109 and the third barrier layer 1110 together are likewise configured in one-piece form and form laminas of the barrier layer 106 which merge into one at folds.

LIST OF REFERENCE NUMERALS

100 Sheetlike composite according to the invention
101 First composite region
102 Second composite region
103 Inner surface
104 Outer surface
105 Inner polymer layer
106 Barrier layer
107 Polyethylene layer
108 Carrier layer
109 First thermoplastic layer B
110 Thermoplastic layer A
111 Layer thickness of the thermoplastic layer A
112 Layer thickness of the first thermoplastic layer B/total layer thickness of the first thermoplastic layer B and the further thermoplastic layers B
201 Further thermoplastic layer B
700 Container precursor according to the invention
701 Fold/edge
702 Circumference
703 First wall region
704 Second wall region
705 Interior
706 Crease
707 First width
708 Second width
709 Longitudinal seam
800 Closed container according to the invention
900 Process according to the invention
901 Process step a)
902 Process step b)
903 Process step c)
904 Process step d)
1000 Device according to the invention
1001 Print image storage means
1002 Surface of print image storage means
1003 Recess
1004 Thermoplastic composition
1005 Direction of rotation
1006 Axial direction
1007 Longitudinal diagonal
1008 Transverse diagonal
1100 Wall
1101 Third wall region
1102 Third width
1103 First wall layer
1104 Second wall layer
1105 Third wall layer
1106 First barrier layer
1107 First carrier layer
1108 Second carrier layer
1109 Second barrier layer
1110 Third barrier layer
1111 Third carrier layer

The invention claimed is:

1. A container precursor surrounding an interior, wherein the container precursor comprises a wall composed of a folded sheetlike composite,
   wherein the wall comprises a first wall region and a second wall region;
   wherein the first wall region comprises a first layer sequence comprising, as mutually superposed layers, from the interior outward, a first wall layer, a second wall layer and a third wall layer;
   wherein the second wall region comprises a second layer sequence comprising, as mutually superposed layers, from the interior outward, the first wall layer, a thermoplastic layer A and the third wall layer;
   wherein the second wall layer is joined to the third wall layer in the first wall region;
   wherein the first wall layer is joined via the thermoplastic layer A to the third wall layer in the second wall region;
   wherein the first wall layer as the first wall layer sequence from the interior outward comprises a first inner polymer layer, a first barrier layer and a first carrier layer;
   wherein the second wall layer as the second wall layer sequence from the interior outward comprises a second carrier layer, a second barrier layer and a second inner polymer layer;
   wherein the third wall layer as the third wall sequence from the interior outward comprises a third inner polymer layer, a third barrier layer and a third carrier layer; wherein the third carrier layer in the first wall region is characterized by a greater layer thickness than either the first carrier layer or the second carrier layer or both;
   wherein the thermoplastic layer A comprises a polyvinyl acetal in a proportion of at least 40% by weight, based on the weight of the thermoplastic layer A; and
   wherein each of the first inner polymer layer, the second inner polymer layer and the third inner polymer layer comprises at least 70 wt.-% of a polyolefin, based in each case on the total weight of the respective inner polymer layer.

2. The container precursor according to claim 1, wherein the container precursor comprises at least 4 folds, each of which constitutes a longitudinal edge of the container precursor.

3. The container precursor according to claim 1, wherein the first wall layer is not joined to the second wall layer in the first wall region.

4. A closed container, obtainable by folding the container precursor according to claim 1 and closing the folded container precursor with a closing tool.

5. The closed container according to claim 4, wherein the closed container has at least 4 edges.

6. The closed container according to claim 4, wherein the closed container has an essentially cuboid construction.

7. The closed container according to claim 4, wherein the closed container is formed from the sheetlike composite to an extent of at least 90% of a full area of the closed container.

8. The closed container according to claim 4, wherein the closed container is of a one- or two-part construction.

* * * * *